(12) United States Patent
Kielb et al.

(10) Patent No.: US 8,787,848 B2
(45) Date of Patent: *Jul. 22, 2014

(54) RF ADAPTER FOR FIELD DEVICE WITH LOW VOLTAGE INTRINSIC SAFETY CLAMPING

(75) Inventors: John A. Kielb, Eden Prairie, MN (US); Brian L. Westfield, Victoria, MN (US); Kelly M. Orth, Apple Valley, MN (US)

(73) Assignee: Rosemount Inc., Eden Prairie, MN (US)

(*) Notice: Subject to any disclaimer, the term of this patent is extended or adjusted under 35 U.S.C. 154(b) by 201 days.

This patent is subject to a terminal disclaimer.

(21) Appl. No.: 12/486,269

(22) Filed: Jun. 17, 2009

(65) Prior Publication Data

US 2009/0253388 A1 Oct. 8, 2009

Related U.S. Application Data

(63) Continuation-in-part of application No. 12/125,187, filed on May 22, 2008, which is a continuation-in-part of application No. 11/842,356, filed on Aug. 21, 2007, now Pat. No. 7,956,738, which is a continuation of application No. 10/878,235, filed on Jun. 28, 2004, now Pat. No. 7,262,693.

(60) Provisional application No. 61/073,094, filed on Jun. 17, 2008, provisional application No. 60/997,760, filed on Oct. 5, 2007.

(51) Int. Cl.
*H01Q 11/12* (2006.01)
*H04B 1/04* (2006.01)

(52) U.S. Cl.
USPC ............... 455/117; 455/115.1; 455/127.1; 455/67.11; 700/19; 700/12; 700/79; 710/12; 710/16; 710/106; 710/72

(58) Field of Classification Search
USPC ............ 455/91, 340, 100, 115.1–115.4, 117, 455/127.1–129, 67.11–69; 700/19, 2, 9, 12, 700/37, 79; 710/11, 12, 16, 106, 72–74
See application file for complete search history.

(56) References Cited

U.S. PATENT DOCUMENTS

| | | | |
|---|---|---|---|
| 2,533,339 A | 12/1950 | Willenborg | 177/311 |
| 2,640,667 A | 6/1953 | Winn | 248/65 |

(Continued)

FOREIGN PATENT DOCUMENTS

| | | |
|---|---|---|
| CH | 672 368 A5 | 11/1989 |
| CN | JP 06 199284 A | 7/1994 |

(Continued)

OTHER PUBLICATIONS

Office Action from Russian Patent Office in Russian Serial No. 2006145434.

(Continued)

*Primary Examiner* — Edward Urban
*Assistant Examiner* — Rui Hu
(74) *Attorney, Agent, or Firm* — Westman, Champlin & Koehler, P.A.

(57) ABSTRACT

An adapter for coupling to a process control transmitter of the type used to monitor a process variable in an industrial process includes a first connection configured to couple to a first side of a two wire process control loop, a second connection configured to couple to a second side of the two wire process control loop and in series with a first connection to a process control transmitter, and a third connection configured to couple to a second connection of the process control transmitter. Wireless communication circuitry is coupled to at least the third connection and is configured to provide wireless communication for the process control transmitter. Intrinsic safety circuitry coupled to at least one of the first, second and third connections is configured to limit transfer of electrical energy to a value which is less than an intrinsic safety value.

25 Claims, 14 Drawing Sheets

(56) References Cited

U.S. PATENT DOCUMENTS

| | | | |
|---|---|---|---|
| 2,883,489 A | 4/1959 | Eadie, Jr. et al. | 335/148 |
| 3,012,432 A | 12/1961 | Moore et al. | 73/40 |
| 3,218,863 A | 11/1965 | Calvert | 73/398 |
| 3,229,759 A | 1/1966 | Grover et al. | 165/105 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,557,621 A | 1/1971 | Ferran | 73/398 |
| 3,568,762 A | 3/1971 | Harbaugh | 165/105 |
| 3,612,851 A | 10/1971 | Fowler | 362/30 |
| 3,631,264 A * | 12/1971 | Morgan | 327/309 |
| 3,633,053 A | 1/1972 | Peters | 310/15 |
| 3,697,835 A | 10/1972 | Satori | 317/246 |
| D225,743 S | 1/1973 | Seltzer | D10/102 |
| 3,742,450 A | 6/1973 | Weller | 375/257 |
| 3,808,480 A | 4/1974 | Johnston | 317/256 |
| 3,881,962 A | 5/1975 | Rubinstein | 136/209 |
| 3,885,432 A | 5/1975 | Herzl | 73/861.22 |
| 3,924,219 A | 12/1975 | Braun | 338/34 |
| 3,931,532 A | 1/1976 | Byrd | 310/4 |
| 4,005,319 A | 1/1977 | Nilsson et al. | 310/8.3 |
| 4,008,619 A | 2/1977 | Alcaide et al. | 73/398 |
| 4,042,757 A | 8/1977 | Jones | 429/104 |
| 4,063,349 A | 12/1977 | Passler et al. | 29/627 |
| 4,084,155 A | 4/1978 | Herzl et al. | 340/870.39 |
| 4,116,060 A | 9/1978 | Frederick | 73/861.22 |
| 4,125,122 A | 11/1978 | Stachurski | 136/205 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,287,553 A | 9/1981 | Braunlich | 361/283 |
| 4,295,179 A | 10/1981 | Read | 361/600 |
| 4,322,724 A | 3/1982 | Grudzinski | 340/595 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,361,045 A | 11/1982 | Iwasaki | 73/654 |
| 4,370,890 A | 2/1983 | Frick | 73/718 |
| 4,383,801 A | 5/1983 | Pryor | 416/17 |
| 4,389,895 A | 6/1983 | Rud, Jr. | 73/724 |
| 4,390,321 A | 6/1983 | Langlois et al. | 417/15 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,459,537 A | 7/1984 | McWhorter | 323/224 |
| 4,475,047 A | 10/1984 | Ebert | 307/66 |
| 4,476,853 A | 10/1984 | Arbogast | 126/578 |
| 4,485,670 A | 12/1984 | Camarda et al. | 73/179 |
| 4,490,773 A | 12/1984 | Moffatt | 361/283 |
| 4,510,400 A | 4/1985 | Kiteley | 307/66 |
| 4,542,436 A | 9/1985 | Carusillo | 361/283 |
| 4,562,742 A | 1/1986 | Bell | 73/718 |
| 4,570,217 A | 2/1986 | Allen et al. | 700/19 |
| 4,590,466 A | 5/1986 | Wiklund et al. | 340/870.28 |
| 4,639,542 A | 1/1987 | Bass et al. | 136/210 |
| 4,670,733 A | 6/1987 | Bell | 338/36 |
| 4,701,938 A | 10/1987 | Bell | 375/257 |
| 4,704,607 A | 11/1987 | Teather et al. | 340/825.07 |
| 4,749,993 A | 6/1988 | Szabo et al. | 340/870.31 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,982,412 A | 1/1991 | Gross | 377/6 |
| 5,009,311 A | 4/1991 | Schenk | 206/332 |
| 5,014,176 A | 5/1991 | Kelleher et al. | 363/26 |
| 5,023,746 A | 6/1991 | Epstein | 361/56 |
| 5,025,202 A | 6/1991 | Ishii et al. | 220/101 |
| 5,045,963 A | 9/1991 | Hansen et al. | 361/87 |
| 5,060,295 A | 10/1991 | Borras et al. | 455/186 |
| 5,079,562 A | 1/1992 | Yarsunas et al. | 343/792 |
| 5,094,109 A | 3/1992 | Dean et al. | 73/718 |
| D331,370 S | 12/1992 | Williams | D10/46 |
| 5,168,419 A | 12/1992 | Delatorre | 361/283 |
| 5,170,671 A | 12/1992 | Miau et al. | 73/861.22 |
| 5,194,819 A | 3/1993 | Briefer | 73/718 |
| 5,223,763 A | 6/1993 | Chang | 310/339 |
| 5,230,250 A | 7/1993 | Delatorre | 73/733 |
| 5,233,875 A | 8/1993 | Obermeier et al. | 73/718 |
| D345,107 S | 3/1994 | Williams | D10/46 |
| 5,313,831 A | 5/1994 | Beckman | 73/204.24 |
| 5,329,818 A | 7/1994 | Frick et al. | 73/708 |
| 5,412,535 A | 5/1995 | Chao et al. | 361/700 |
| 5,492,016 A | 2/1996 | Pinto et al. | 73/724 |
| 5,495,769 A | 3/1996 | Broden et al. | 73/18 |
| 5,506,757 A | 4/1996 | Brorby | 361/796 |
| 5,531,936 A | 7/1996 | Kanatzidis et al. | 252/587 |
| 5,535,243 A * | 7/1996 | Voegele et al. | 375/259 |
| 5,542,300 A | 8/1996 | Lee | 73/724 |
| 5,546,804 A | 8/1996 | Johnson et al. | 73/431 |
| 5,554,809 A | 9/1996 | Tobita et al. | 73/700 |
| 5,554,922 A | 9/1996 | Kunkel | 322/3 |
| 5,599,172 A | 2/1997 | McCabe | 417/334 |
| 5,606,513 A | 2/1997 | Louwagie et al. | 702/138 |
| 5,610,552 A | 3/1997 | Schlesinger et al. | 327/560 |
| 5,614,128 A | 3/1997 | Kanatzidis et al. | 252/582 |
| 5,618,471 A | 4/1997 | Kanatzidis et al. | 252/582 |
| 5,637,802 A | 6/1997 | Frick et al. | 73/724 |
| 5,642,301 A | 6/1997 | Warrior et al. | 364/571.02 |
| 5,644,185 A | 7/1997 | Miller | 310/306 |
| 5,656,782 A | 8/1997 | Powell, II et al. | 73/756 |
| 5,665,899 A | 9/1997 | Willcox | 731/1.63 |
| 5,672,832 A | 9/1997 | Cucci et al. | 73/861.52 |
| 5,682,476 A * | 10/1997 | Tapperson et al. | 370/225 |
| 5,705,978 A | 1/1998 | Frick et al. | 340/511 |
| 5,710,552 A | 1/1998 | McCoy et al. | 340/870.21 |
| 5,722,249 A | 3/1998 | Miller, Jr. | 62/238.2 |
| 5,726,845 A | 3/1998 | Ho | 361/86 |
| 5,726,846 A | 3/1998 | Houbre | 361/93 |
| 5,754,419 A | 5/1998 | Ho | 363/89 |
| 5,757,608 A | 5/1998 | Bernot et al. | 361/283.4 |
| 5,764,891 A | 6/1998 | Warrior | 710/72 |
| 5,787,120 A | 7/1998 | Louagie et al. | 375/257 |
| 5,793,963 A | 8/1998 | Tapperson et al. | 395/200.31 |
| 5,803,604 A | 9/1998 | Pompei | 374/181 |
| 5,811,201 A | 9/1998 | Skowronski | 429/17 |
| 5,851,083 A | 12/1998 | Palan | 403/337 |
| 5,870,695 A | 2/1999 | Brown et al. | 702/138 |
| 5,872,494 A | 2/1999 | Palan et al. | 333/252 |
| 5,899,962 A | 5/1999 | Louwagie et al. | 702/138 |
| 5,911,162 A | 6/1999 | Denner | 73/718 |
| 5,929,372 A | 7/1999 | Oudoire et al. | 136/208 |
| 5,954,526 A | 9/1999 | Smith | 439/136 |
| 5,957,727 A | 9/1999 | Page, Jr. | 439/607.58 |
| 5,978,658 A | 11/1999 | Shoji | 455/66 |
| 5,992,240 A | 11/1999 | Tsuruoka et al. | 73/718 |
| 6,013,204 A | 1/2000 | Kanatzidis et al. | 252/584 |
| 6,038,927 A | 3/2000 | Karas | 73/706 |
| 6,062,095 A | 5/2000 | Mulrooney et al. | 73/866.5 |
| 6,079,276 A | 6/2000 | Frick et al. | 73/18 |
| 6,104,759 A * | 8/2000 | Carkner et al. | 375/295 |
| 6,109,979 A | 8/2000 | Garnett | 439/709 |
| 6,126,327 A | 10/2000 | Bi et al. | 709/221 |
| 6,127,739 A | 10/2000 | Appa | 290/55 |
| 6,150,798 A | 11/2000 | Ferry et al. | 323/273 |
| D439,177 S | 3/2001 | Fandrey et al. | D10/46 |
| D439,178 S | 3/2001 | Fandrey et al. | D10/46 |
| D439,179 S | 3/2001 | Fandrey et al. | D10/46 |
| D439,180 S | 3/2001 | Fandrey et al. | D10/85 |
| D439,181 S | 3/2001 | Fandrey et al. | D10/46 |
| D441,672 S | 5/2001 | Fandrey et al. | D10/52 |
| 6,236,096 B1 | 5/2001 | Chang et al. | 257/419 |
| 6,236,334 B1 | 5/2001 | Tapperson et al. | 340/825 |
| 6,255,010 B1 | 7/2001 | George et al. | 429/30 |
| 6,282,247 B1 | 8/2001 | Shen | 375/285 |
| 6,295,875 B1 | 10/2001 | Frick et al. | 73/718 |
| 6,312,617 B1 | 11/2001 | Kanatzidis et al. | 252/62.3 |
| 6,326,764 B1 | 12/2001 | Virtudes | 320/101 |

(56) References Cited

U.S. PATENT DOCUMENTS

| | | | |
|---|---|---|---|
| 6,338,283 B1 | 1/2002 | Blazquez Navarro | 73/865.8 |
| 6,360,277 B1 | 3/2002 | Ruckley et al. | 709/250 |
| 6,366,436 B1 | 4/2002 | Maier et al. | 361/93.9 |
| 6,385,972 B1 | 5/2002 | Fellows | 60/517 |
| 6,405,139 B1 | 6/2002 | Kicinski et al. | 702/33 |
| 6,429,786 B1 | 8/2002 | Bansemir et al. | 340/870.27 |
| 6,441,747 B1 | 8/2002 | Khair et al. | 340/870.16 |
| 6,457,367 B1 | 10/2002 | Behm et al. | 73/753 |
| 6,480,699 B1 | 11/2002 | Lovoi | 455/41.2 |
| 6,484,107 B1 | 11/2002 | Roper et al. | 702/50 |
| 6,487,912 B1 | 12/2002 | Behm et al. | 73/753 |
| 6,504,489 B1 | 1/2003 | Westfield et al. | 340/870.3 |
| 6,508,131 B2 | 1/2003 | Frick | 73/756 |
| 6,510,740 B1 | 1/2003 | Behm et al. | 73/708 |
| 6,511,337 B1 | 1/2003 | Fandrey et al. | 439/320 |
| D471,829 S | 3/2003 | Dennis et al. | D10/85 |
| D472,831 S | 4/2003 | Dennis et al. | D10/85 |
| 6,546,805 B2 | 4/2003 | Fandrey et al. | 73/753 |
| 6,553,076 B1 | 4/2003 | Huang | 375/257 |
| 6,563,908 B1 | 5/2003 | Enck, Jr. | 378/123 |
| 6,568,279 B2 | 5/2003 | Behm et al. | 73/753 |
| 6,571,132 B1 | 5/2003 | Davis et al. | 700/2 |
| 6,574,515 B1 * | 6/2003 | Kirkpatrick et al. | 700/19 |
| 6,593,857 B1 | 7/2003 | Roper et al. | 340/870.3 |
| 6,609,427 B1 | 8/2003 | Westfield et al. | 73/753 |
| 6,640,308 B1 | 10/2003 | Keyghobad et al. | 713/300 |
| 6,661,220 B1 | 12/2003 | Glehr | 324/207.17 |
| 6,662,662 B1 | 12/2003 | Nord et al. | 73/715 |
| 6,667,594 B2 | 12/2003 | Chian | 318/696 |
| 6,680,690 B1 | 1/2004 | Nilsson et al. | 342/124 |
| 6,690,182 B2 | 2/2004 | Kelly et al. | 324/700 |
| 6,711,446 B2 | 3/2004 | Kirkpatrick et al. | 700/19 |
| 6,747,573 B1 | 6/2004 | Gerlach et al. | 340/870.21 |
| 6,765,968 B1 | 7/2004 | Nelson et al. | 375/257 |
| 6,771,560 B2 | 8/2004 | Lyon et al. | 367/13 |
| 6,774,814 B2 | 8/2004 | Hilleary | 340/870.07 |
| 6,778,100 B2 | 8/2004 | Schempf | 340/870.07 |
| 6,792,259 B1 | 9/2004 | Parise | 455/343.1 |
| 6,823,072 B1 | 11/2004 | Hoover | 381/7 |
| 6,838,859 B2 | 1/2005 | Shah | 322/38 |
| 6,839,546 B2 * | 1/2005 | Hedtke | 455/67.11 |
| 6,839,790 B2 | 1/2005 | Barros De Almeida et al. | 710/305 |
| 6,843,110 B2 | 1/2005 | Deane et al. | 73/114.35 |
| 6,891,477 B2 | 5/2005 | Aronstam | 340/606 |
| 6,891,838 B1 | 5/2005 | Petite et al. | 370/401 |
| 6,898,980 B2 | 5/2005 | Behm et al. | 73/756 |
| 6,904,295 B2 | 6/2005 | Yang | 455/522 |
| 6,907,383 B2 | 6/2005 | Eryurek et al. | 702/183 |
| 6,910,332 B2 | 6/2005 | Fellows | 60/520 |
| 6,942,728 B2 | 9/2005 | Caillat et al. | 117/3 |
| 6,961,665 B2 | 11/2005 | Slezak | 702/61 |
| 6,984,899 B1 | 1/2006 | Rice | 290/44 |
| 6,995,677 B2 | 2/2006 | Aronstam et al. | 340/606 |
| 6,995,685 B2 | 2/2006 | Randall | 340/870.39 |
| 7,010,294 B1 | 3/2006 | Pyotsia et al. | 455/420 |
| 7,036,983 B2 | 5/2006 | Green et al. | 374/179 |
| 7,043,250 B1 | 5/2006 | DeMartino | 455/445 |
| 7,058,542 B2 | 6/2006 | Hauhia et al. | 702/183 |
| 7,073,394 B2 | 7/2006 | Foster | 73/861.22 |
| 7,088,285 B2 | 8/2006 | Smith | 342/124 |
| 7,109,883 B2 | 9/2006 | Trimble et al. | 340/870.16 |
| 7,116,036 B2 | 10/2006 | Balasubramaniam et al. | 310/322 |
| 7,129,663 B2 | 10/2006 | Suzuki | 318/504 |
| 7,136,725 B1 | 11/2006 | Paciorek et al. | 700/295 |
| 7,173,343 B2 | 2/2007 | Kugel | 290/1 R |
| 7,197,953 B2 | 4/2007 | Olin | 73/866.5 |
| 7,233,745 B2 | 6/2007 | Loechner | 398/128 |
| 7,262,693 B2 * | 8/2007 | Karschnia et al. | 340/508 |
| 7,271,679 B2 | 9/2007 | Lundberg et al. | 333/24 |
| 7,301,454 B2 | 11/2007 | Seyfang et al. | 340/539.26 |
| 7,319,191 B2 * | 1/2008 | Poon et al. | 174/50.62 |
| 7,329,959 B2 | 2/2008 | Kim et al. | 290/2 |
| 7,351,098 B2 | 4/2008 | Gladd et al. | 439/578 |
| 7,518,553 B2 | 4/2009 | Zhang et al. | 343/700 MS |
| 7,539,593 B2 | 5/2009 | Machacek | 702/127 |
| 7,560,907 B2 | 7/2009 | Nelson | 322/37 |
| 7,626,141 B2 | 12/2009 | Rodriguez-Medina et al. | 219/260 |
| 7,726,017 B2 | 6/2010 | Evans et al. | 29/854 |
| 7,835,119 B2 | 11/2010 | Florence et al. | 361/18 |
| 7,983,049 B2 | 7/2011 | Leifer et al. | 361/728 |
| 8,005,514 B2 | 8/2011 | Saito et al. | 455/572 |
| 8,150,462 B2 | 4/2012 | Guenter et al. | 455/557 |
| 8,208,581 B2 * | 6/2012 | Westfield et al. | 375/295 |
| 8,452,255 B2 * | 5/2013 | Orth | 455/343.5 |
| 8,538,560 B2 * | 9/2013 | Brown et al. | 700/22 |
| 2001/0025349 A1 | 9/2001 | Sharood et al. | 713/340 |
| 2002/0011115 A1 | 1/2002 | Frick | 73/718 |
| 2002/0029130 A1 | 3/2002 | Eryurek et al. | 702/183 |
| 2002/0065631 A1 | 5/2002 | Loechner | 702/188 |
| 2002/0082799 A1 | 6/2002 | Pramanik | 702/130 |
| 2002/0095520 A1 | 7/2002 | Wettstein et al. | 709/253 |
| 2002/0097031 A1 | 7/2002 | Cook et al. | 323/273 |
| 2002/0105968 A1 | 8/2002 | Pruzan et al. | 370/465 |
| 2002/0148236 A1 | 10/2002 | Bell | 62/3.3 |
| 2002/0163323 A1 | 11/2002 | Kasai et al. | 323/284 |
| 2003/0032993 A1 | 2/2003 | Mickle et al. | 600/509 |
| 2003/0042740 A1 | 3/2003 | Holder et al. | 290/1 A |
| 2003/0043052 A1 | 3/2003 | Tapperson et al. | 340/825.37 |
| 2003/0079553 A1 | 5/2003 | Cain et al. | 73/861.27 |
| 2003/0083038 A1 | 5/2003 | Poon et al. | 455/344 |
| 2003/0097521 A1 | 5/2003 | Pfandler et al. | 711/103 |
| 2003/0134161 A1 | 7/2003 | Gore et al. | 429/12 |
| 2003/0143958 A1 | 7/2003 | Elias et al. | 455/73 |
| 2003/0167631 A1 | 9/2003 | Hallenbeck | 29/835 |
| 2003/0171827 A1 * | 9/2003 | Keyes et al. | 700/19 |
| 2003/0199778 A1 | 10/2003 | Mickle et al. | 600/509 |
| 2003/0204371 A1 | 10/2003 | Sciamanna | 702/183 |
| 2004/0081872 A1 | 4/2004 | Herman et al. | 429/26 |
| 2004/0085240 A1 * | 5/2004 | Faust | 342/124 |
| 2004/0086021 A1 | 5/2004 | Litwin | 374/120 |
| 2004/0124854 A1 | 7/2004 | Slezak | 324/644 |
| 2004/0142733 A1 | 7/2004 | Parise | 455/572 |
| 2004/0159235 A1 | 8/2004 | Marganski et al. | 95/116 |
| 2004/0183550 A1 | 9/2004 | Fehrenbach et al. | 27/26 |
| 2004/0184517 A1 | 9/2004 | Westfield et al. | 375/219 |
| 2004/0199681 A1 | 10/2004 | Hedtke | 710/37 |
| 2004/0200519 A1 | 10/2004 | Sterzel et al. | 136/238 |
| 2004/0203421 A1 * | 10/2004 | Hedtke | 455/67.11 |
| 2004/0203434 A1 | 10/2004 | Karschnia et al. | 455/67.11 |
| 2004/0211456 A1 | 10/2004 | Keyes et al. | 136/243 |
| 2004/0214543 A1 | 10/2004 | Osone et al. | 455/197.2 |
| 2004/0218326 A1 | 11/2004 | Duren et al. | 361/93.1 |
| 2004/0242169 A1 | 12/2004 | Albsmeier et al. | 455/91 |
| 2004/0249483 A1 | 12/2004 | Wojsznis et al. | 700/52 |
| 2004/0259533 A1 | 12/2004 | Nixon et al. | 455/414.1 |
| 2005/0011278 A1 | 1/2005 | Brown et al. | 73/861.18 |
| 2005/0017602 A1 | 1/2005 | Arms et al. | 310/339 |
| 2005/0023858 A1 | 2/2005 | Bingle et al. | 296/76 |
| 2005/0029236 A1 | 2/2005 | Gambino et al. | 219/121.69 |
| 2005/0040570 A1 | 2/2005 | Asselborn | 266/99 |
| 2005/0046595 A1 | 3/2005 | Blyth | 340/908 |
| 2005/0056106 A1 | 3/2005 | Nelson et al. | 73/866.3 |
| 2005/0072239 A1 | 4/2005 | Longsdorf et al. | 73/649 |
| 2005/0074324 A1 | 4/2005 | Yoo | 415/4.3 |
| 2005/0076944 A1 | 4/2005 | Kanatzidis et al. | 136/239 |
| 2005/0082949 A1 | 4/2005 | Tsujiura | 310/339 |
| 2005/0099010 A1 | 5/2005 | Hirsch | 290/42 |
| 2005/0106927 A1 | 5/2005 | Goto et al. | 439/404 |
| 2005/0109395 A1 | 5/2005 | Seberger | 137/8 |
| 2005/0115601 A1 | 6/2005 | Olsen et al. | 136/212 |
| 2005/0118468 A1 | 6/2005 | Adams et al. | 429/22 |
| 2005/0122653 A1 | 6/2005 | McCluskey et al. | 361/92 |
| 2005/0130605 A1 | 6/2005 | Karschnia et al. | 455/90.3 |
| 2005/0132808 A1 | 6/2005 | Brown et al. | 73/592 |
| 2005/0134148 A1 | 6/2005 | Buhler et al. | 310/339 |
| 2005/0139250 A1 | 6/2005 | DeSteese et al. | 136/212 |
| 2005/0146220 A1 | 7/2005 | Hamel et al. | 307/44 |
| 2005/0153593 A1 | 7/2005 | Takayanagi et al. | 439/352 |
| 2005/0164684 A1 | 7/2005 | Chen et al. | 455/414.1 |
| 2005/0197803 A1 | 9/2005 | Eryurek et al. | 702/185 |
| 2005/0201349 A1 | 9/2005 | Budampati | 370/342 |

(56) References Cited

U.S. PATENT DOCUMENTS

| | | | |
|---|---|---|---|
| 2005/0208908 A1* | 9/2005 | Karschnia et al. | 455/127.1 |
| 2005/0222698 A1 | 10/2005 | Eryurek et al. | 700/90 |
| 2005/0228509 A1 | 10/2005 | James | 700/19 |
| 2005/0235758 A1 | 10/2005 | Kowal et al. | 73/891.29 |
| 2005/0242979 A1 | 11/2005 | Hamilton et al. | 341/144 |
| 2005/0245291 A1* | 11/2005 | Brown et al. | 455/572 |
| 2005/0276233 A1 | 12/2005 | Shepard et al. | 370/254 |
| 2005/0281215 A1 | 12/2005 | Budampati et al. | 370/328 |
| 2005/0289276 A1* | 12/2005 | Karschnia et al. | 710/305 |
| 2006/0002368 A1 | 1/2006 | Budampati et al. | 370/351 |
| 2006/0028327 A1 | 2/2006 | Amis | 340/431 |
| 2006/0036404 A1 | 2/2006 | Wiklund et al. | 702/183 |
| 2006/0058847 A1 | 3/2006 | Lenz et al. | 607/5 |
| 2006/0060236 A1 | 3/2006 | Kim e al. | 136/203 |
| 2006/0063522 A1 | 3/2006 | McFarland | 455/423 |
| 2006/0077917 A1 | 4/2006 | Brahmajosyula et al. | 370/310 |
| 2006/0092039 A1* | 5/2006 | Saito et al. | 340/825.37 |
| 2006/0111058 A1* | 5/2006 | Grant et al. | 455/127.1 |
| 2006/0116102 A1 | 6/2006 | Brown et al. | |
| 2006/0128689 A1 | 6/2006 | Gomtsyan et al. | 514/217.01 |
| 2006/0131428 A1 | 6/2006 | Wang et al. | 235/492 |
| 2006/0142875 A1 | 6/2006 | Keyes, IV et al. | 700/1 |
| 2006/0148410 A1 | 7/2006 | Nelson et al. | 455/67.11 |
| 2006/0181406 A1 | 8/2006 | Petite et al. | 340/521 |
| 2006/0194547 A1 | 8/2006 | Davis | 455/69 |
| 2006/0227729 A1 | 10/2006 | Budampati et al. | 370/278 |
| 2006/0274644 A1 | 12/2006 | Budampati et al. | 370/216 |
| 2006/0274671 A1 | 12/2006 | Budampati et al. | 370/254 |
| 2006/0278023 A1 | 12/2006 | Garneyer et al. | 73/862.333 |
| 2006/0282580 A1 | 12/2006 | Russell et al. | 710/62 |
| 2006/0287001 A1 | 12/2006 | Budampati et al. | 455/552.1 |
| 2006/0290328 A1 | 12/2006 | Orth | 323/218 |
| 2007/0006528 A1 | 1/2007 | Diebold et al. | 48/197 R |
| 2007/0030816 A1 | 2/2007 | Kolavennu | 370/252 |
| 2007/0030832 A1 | 2/2007 | Gonia et al. | 370/338 |
| 2007/0039371 A1 | 2/2007 | Omata et al. | 73/9 |
| 2007/0054630 A1 | 3/2007 | Scheible et al. | 455/90.3 |
| 2007/0055463 A1 | 3/2007 | Florenz et al. | 702/50 |
| 2007/0079250 A1 | 4/2007 | Bump et al. | 715/762 |
| 2007/0135867 A1 | 6/2007 | Klosterman et al. | 607/60 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0273496 A1 | 11/2007 | Hedtke | 340/506 |
| 2007/0275755 A1 | 11/2007 | Chae et al. | 455/575 |
| 2007/0279009 A1 | 12/2007 | Kobayashi | 320/166 |
| 2007/0280144 A1 | 12/2007 | Hodson et al. | 370/312 |
| 2007/0280178 A1 | 12/2007 | Hodson et al. | 370/338 |
| 2007/0280286 A1 | 12/2007 | Hodson et al. | 370/466 |
| 2007/0280287 A1 | 12/2007 | Samudrala et al. | 370/466 |
| 2007/0282463 A1 | 12/2007 | Hodson et al. | 700/20 |
| 2007/0285224 A1 | 12/2007 | Karschnia et al. | 340/538 |
| 2007/0288204 A1 | 12/2007 | Gienke et al. | 702/188 |
| 2008/0010600 A1 | 1/2008 | Katano | 715/748 |
| 2008/0030423 A1 | 2/2008 | Shigemoto | 343/872 |
| 2008/0054645 A1 | 3/2008 | Kulkarni et al. | 290/52 |
| 2008/0079641 A1 | 4/2008 | Grunig et al. | |
| 2008/0083446 A1 | 4/2008 | Chakraborty et al. | 136/205 |
| 2008/0088464 A1 | 4/2008 | Gutierrez | 340/606 |
| 2008/0114911 A1 | 5/2008 | Schumacher | 710/72 |
| 2008/0123581 A1 | 5/2008 | Wells et al. | 370/315 |
| 2008/0141769 A1 | 6/2008 | Schmidt et al. | 73/204.19 |
| 2008/0268784 A1 | 10/2008 | Kantzes et al. | 455/66.1 |
| 2008/0273486 A1 | 11/2008 | Pratt et al. | 370/328 |
| 2008/0280568 A1* | 11/2008 | Kielb et al. | 455/74.1 |
| 2008/0310195 A1 | 12/2008 | Seberger et al. | 363/26 |
| 2009/0015216 A1 | 1/2009 | Seberger et al. | 323/234 |
| 2009/0066587 A1 | 3/2009 | Hayes et al. | 343/702 |
| 2009/0081957 A1 | 3/2009 | Sinreich | 455/68 |
| 2009/0120169 A1 | 5/2009 | Chandler et al. | 73/54.41 |
| 2009/0145656 A1 | 6/2009 | Tschudin | 174/521 |
| 2009/0146502 A1* | 6/2009 | Sinreich | 307/104 |
| 2009/0167613 A1 | 7/2009 | Hershey et al. | 343/702 |
| 2009/0195222 A1 | 8/2009 | Lu et al. | 322/3 |
| 2009/0200489 A1 | 8/2009 | Tappel et al. | 250/492.3 |
| 2009/0250340 A1 | 10/2009 | Sasaki et al. | 204/298.02 |
| 2009/0253388 A1 | 10/2009 | Kielb et al. | 455/117 |
| 2009/0260438 A1 | 10/2009 | Hedtke | 73/579 |
| 2009/0309558 A1 | 12/2009 | Kielb | 323/234 |
| 2009/0311971 A1 | 12/2009 | Kielb et al. | 455/74.1 |
| 2009/0311975 A1 | 12/2009 | Vanderaa et al. | 455/90.3 |
| 2009/0311976 A1 | 12/2009 | Vanderaa et al. | 455/90.3 |
| 2010/0000316 A1 | 1/2010 | Fehrenbach et al. | 73/295 |
| 2010/0254900 A1 | 10/2010 | Campbell et al. | 424/1.65 |
| 2012/0041582 A1 | 2/2012 | Wallace | 700/109 |
| 2013/0079895 A1* | 3/2013 | Hedtke | 700/9 |

FOREIGN PATENT DOCUMENTS

| | | | |
|---|---|---|---|
| CN | 1251953 | | 5/2000 |
| CN | 1 429 354 | A | 7/2003 |
| CN | 1 442 822 | A | 9/2003 |
| CN | 100386602 | C | 4/2005 |
| CN | 1969238 | | 5/2007 |
| CN | 100386602 | C | 5/2008 |
| DE | 2710211 | | 9/1978 |
| DE | 3340834 | A1 | 5/1985 |
| DE | 37 11 754 | A1 | 10/1988 |
| DE | 38 42 379 | A1 | 6/1990 |
| DE | 3842379 | | 6/1990 |
| DE | 196 22 295 | | 5/1996 |
| DE | 201 07 112 | U1 | 5/2001 |
| DE | 201 07 112 | U1 | 7/2001 |
| DE | 101 04 582 | A1 | 10/2001 |
| DE | 100 41 160 | | 3/2002 |
| DE | 102 21 931 | A1 | 5/2002 |
| DE | 10 2004 020 393 | | 11/2005 |
| EP | 0 518 916 | B1 | 2/1991 |
| EP | 0 524 550 | A1 | 1/1993 |
| EP | 0729294 | | 8/1996 |
| EP | 0 895 209 | A1 | 2/1999 |
| EP | 0 945 714 | | 9/1999 |
| EP | 1 202 145 | A1 | 10/2000 |
| EP | 1 202 145 | A1 | 5/2002 |
| EP | 1 192 614 | | 1/2003 |
| EP | 1 293 853 | A1 | 3/2003 |
| EP | 1879294 | | 1/2008 |
| FI | 118699 | B | 2/2008 |
| GB | 1 397 435 | A | 6/1975 |
| GB | 2 300 265 | A | 10/1996 |
| GB | 2 403 043 | | 6/2004 |
| JP | 2-35803 | | 2/1990 |
| JP | 02067794 | | 7/1990 |
| JP | 4-335796 | | 11/1992 |
| JP | 06 199284 | A | 7/1994 |
| JP | 8-125767 | | 5/1996 |
| JP | 8-249997 | | 9/1996 |
| JP | 9-065441 | | 3/1997 |
| JP | 9065441 | A | 3/1997 |
| JP | 09-182308 | | 7/1997 |
| JP | 2000/304148 | | 11/2000 |
| JP | 2003/070079 | | 11/2000 |
| JP | 2001-524226 | | 11/2001 |
| JP | 2002369554 | | 12/2002 |
| JP | 2003/042881 | | 2/2003 |
| JP | 2003-051894 | | 2/2003 |
| JP | 2003051894 | | 2/2003 |
| JP | 2003134261 | | 5/2003 |
| JP | 2003-195903 | | 7/2003 |
| JP | 2004021877 | | 1/2004 |
| JP | 2004 146254 | | 5/2004 |
| JP | 2004146254 | | 5/2004 |
| JP | 2004208476 | | 7/2004 |
| JP | 2004-317593 | | 11/2004 |
| JP | 2004/317593 | | 11/2004 |
| JP | 2005-122744 | | 5/2005 |
| JP | 2005-207648 | | 7/2005 |
| JP | 2005/207648 | | 8/2005 |
| JP | 2006-014589 | | 1/2006 |
| JP | 2006014589 | A | 1/2006 |
| JP | 2006-180603 | | 7/2006 |
| JP | 2007-200940 | | 8/2007 |
| JP | 2008-17663 | | 1/2008 |
| JP | 2008-504790 | | 2/2008 |

(56) References Cited

FOREIGN PATENT DOCUMENTS

| | | |
|---|---|---|
| JP | 2008504790 A | 2/2008 |
| JP | 2010-530211 | 9/2010 |
| RU | 2 131 934 C1 | 6/1999 |
| RU | 2168062 | 5/2001 |
| RU | 2342639 C2 | 8/2003 |
| RU | 2003128989 | 1/2007 |
| WO | WO 91/13417 | 9/1991 |
| WO | WO 95/07522 | 3/1995 |
| WO | WO 96/12993 | 5/1996 |
| WO | WO 99/53286 | 10/1999 |
| WO | WO 01/01742 | 1/2001 |
| WO | WO 01/48723 | 7/2001 |
| WO | WO 01/51836 | 7/2001 |
| WO | WO 01/76148 | 10/2001 |
| WO | WO 02/05241 | 1/2002 |
| WO | WO 03/023536 | 3/2003 |
| WO | WO 03/089881 | 10/2003 |
| WO | 2004/023423 | 3/2004 |
| WO | WO 2004/038998 | 5/2004 |
| WO | WO 2004/082051 | 9/2004 |
| WO | WO 2004/094892 | 11/2004 |
| WO | WO 2005/060482 | 7/2005 |
| WO | WO 2005/086331 | 9/2005 |
| WO | WO 2006/109362 | 10/2006 |
| WO | WO 2007/002769 | 1/2007 |
| WO | WO 2007/031435 | 3/2007 |
| WO | WO 2007/037988 | 4/2007 |
| WO | WO 2008/0098583 | 8/2008 |
| WO | WO 2009/003146 | 12/2008 |
| WO | WO 2009/003148 | 12/2008 |
| WO | WO 2009/063056 | 5/2009 |

OTHER PUBLICATIONS

Notification of Transmittal of the International Search Report or the Declaration—PCT/US03/10403.
Notification of Transmittal of the International Search Report and the Written Opinion—PCT/US2005/021757.
Notification of Transmittal of the International Search Report and the Written Opinion for International application No. PCT/US2009/062152.
Communication pursuant to Rules 161(1) and 162 EPC for Application No. 09767061.6-1269 PCT/US2009003616; date Jan. 28, 2011.
Communication pursuant to Rules 161(1) and 162 EPC for Application No. 09767062.4-1244 PCT/US2009003619; date Jan. 27, 2011; date stamp Feb. 2, 2011.
Seventh Office Action from Chinese Patent App. No. 200580014212.4 issued on Jan. 31, 2011, date stamped Feb. 2, 2011.
Decision on Refusal to Grant from Russian patent application No. 2006145434 dated Feb. 18, 2011.
Office Action from related U.S. Appl. No. 10/878,235; date of Office action mailed Mar. 8, 2006; 5 pages.
Second Office Action for the corresponding Chinese Patent Application No. 200680035248.5, dated Oct. 19, 2011, 22 pgs.
Communication Pursuant to Rules 161(1) and 162 EPC for European Application No. 10752246.8, dated May 3, 2012, 2 pages.
Written Opinion for Singapore Patent Application No. 2010092278, dated Feb. 16, 2012, 9 pages.
Written Opinion for Singapore Patent Application No. 2010092245, dated Jan. 6, 2012, 11 pages.
Japanese Office Action from Japanese Application No. 2011-514605, dated Jun. 19, 2012, 7 pages.
Communication Pursuant to Rules 161(1) and 162 EPC for European Application No. EP 10765871.8, dated Apr. 27, 2012, 2 pages.
Office Action from Russian Patent Application No. 2011101386, dated Apr. 23, 2012, 4 pages.
Communication Pursuant to Rules 161(1) and 162 EPC for application Serial No. EP 10752246.8, dated May 3, 2012.
Written Opinion for the related Singapore patent application No. 2010092278 dated Feb. 16, 2012.
Written Opinion for the related Singapore patent application No. 2010092245 dated Jan. 6, 2012.
Japanese Office Action from JP 2011-514605, dated Jun. 19, 2012.
Communication Pursuant to Rules 161(1) and 162 EPC for application Serial No. EP 10765871.8, dated Apr. 27, 2012.
Office Action from Russian patent application No. 2011101386 dated Apr. 23, 2012, 4 pages.
Chinese Office Action from CN200980122835.1, dated Jul. 3, 2012.
Office Action from U.S. Appl. No. 12/125,187, dated Aug. 25, 2011.
Office Action from U.S. Appl. No. 12/125,187, dated Apr. 20, 2011.
Chinese Office Action from CN200980122761.1, dated Aug. 31, 2012.
Official Action for the corresponding Russian patent application No. 2011101386 transmitted Dec. 23, 2011.
Written Opinion from Singapore Application No. 201009093-4, dated Feb. 20, 2012.
First Japanese Office Action for Japanese Patent Application No. 2011-514604, issued Jul. 17, 2012, 7 pages.
Canadian Office Action for Canadian Application No. 2,726,707, dated Aug. 1, 2012, 3 pages.
First Office Action from Japanese patent application No. 2011514603, dated Jul. 10, 212.
First Office Action from Chinese patent application No. 200980122613.X, dated Aug. 15, 2012.
Second Office Action from Chinese patent application No. 200980122611.0 dated Aug. 20, 2012.
Official Action from Canadian patent application No. 2563337 dated Sep. 4, 2012.
Examination Report of the European Patent Office in Application No. 05724190.3 dated Aug. 1, 2007.
Official Communication from European patent application No. 05746241.8 dated Nov. 12, 2010.
The Minutes in accordance with Rule 124(4) EPC for European application No. 05746241.8 dated Nov. 4, 2010.
Communication from corresponding EP application No. 08837236.2 dated Nov. 3, 2010.
Notification of Transmittal of the International Search Report and the Written Opinion for the international patent application No. PCT/US2010/047744 dated Dec. 10, 2010.
Third Office Action for Chinese patent application No. 200680015575.4, dated Jun. 2010.
Fourth Official Action for Russian patent application No. 2008116682, dated Dec. 18, 2009.
English machine translation of JP2004208476 A.
"Every Little Helps," Economist, vol. 278, No. 8469, p. 78, Mar. 18, 2006.
"Thermal Design and Heat Sink Manufacturing & Testing —Total Thermal and Heat Sink . . . ," http://www.enertron-inc.com/enertron-products/integrated-heat-sink.php, Mar. 31, 2006.
Zahnd et al., "Piezoelectric Windmill. A Novel Solution to Remote Sensing," Japanese Journal of Applied Physics, v. 44, No. 3, p. L104-L105, 2005.
"Heat Pipe—Wikipedia, the free encyclopedia," http://en.wikipedia.org/wiki/Heat_pipe, Mar. 31, 2006.
"High Power Single PSE Controller With Internal Switch," Linear Technology LTC4263-1, p. 1-20.
Office Action from European patent application No. 07837769.4, dated Jul. 14, 2009.
First Office Action from Australian patent application No. 2005248759, dated Apr. 30, 2009.
Second Office Action from Australian patent application No. 2005248759, dated Aug. 28, 2009.
Office Action from Chinese Patent Application No. 200880110323.9, dated Jan. 29, 2012.
Written Opinion and Search Report from the related Singapore patent application No. 201009226-0 dated Mar. 16, 2012.
Office Action from the related Russian patent application No. 2011101364 dated Feb. 8, 2012.
Communication Pursuant to Rules 161(1) and 162 EPC for application Serial No. EP 09767062.4, dated Jan. 27, 2011.
"Wireless Dual Analog Input Interface Transmitter Installation and User's Manual", by Honeywell International Inc., Phoenix, Arizona, pp. ii-vi and 7-43, Dec. 2003.
Rosemount Reference Manual 00809-0100-4022,Rev AA, Jul. 2002, "Model 4600 Oil & Gas Panel Transmitter," 65 pages.

(56) References Cited

OTHER PUBLICATIONS

USA & Metric Thread Standards http://www.carrlane.com/Catalog/index.cfm/29425071F0B221118070C1C513906103E0B05543B0B012009083C3B285357474A2D020609090C0015312A36515F554A5B.
Rejection Notice for Japanese patent application No. 2007527282 dated Jul. 22, 2010.
1$^{st}$ Chinese Office Action for Chinese Application No. 200980122611.0, dated Nov. 23, 2011, 5 pgs.
2$^{nd}$ Chinese Office Action for Chinese Application No. 200680035248.5, dated Oct. 19, 2011, 22 pgs.
1$^{st}$ Chinese Office Action for Chinese Application No. 200980122611.0, dated Nov. 23, 2011, 5 pages.
Official Action from Russian patent application No. 2009139488, dated Oct. 8, 2012.
Examination Report for the related Singapore application No. 201009226-0 dated Oct. 12, 2012.
Decision of Rejection (final rejection) for Japanese Patent Application No. 2011-514604, dated Jan. 29, 2013, 8 pages.
Second Office Action for Chinese Patent Application No. 200980122835.1, dated Mar. 15, 2013, 20 pages.
Official Action from Canadian Patent Application No. 2726613, dated Jan. 11, 2013, 3 pages.
Official Action from Canadian Patent Application No. 2726608, dated Dec. 5, 2012, 2 pages.
Examination Report from Singapore Application No. 2010092278, dated Jan. 7, 2013, 7 pages.
Official Action from Russian patent application No. 2009139488, dated Oct. 8, 2012. 3 pages.
Examination Report for the Singapore application No. 201009226-0 dated Oct. 12, 2012.
Invitation to Response to Written Opinion for Singapore application No. 201009093-4 dated Nov. 5, 2012.
Official Action from the Canadian patent application No. 2726613 dated Jan. 11, 2013.
Official Action from the Canadian patent application No. 2726608 dated Dec. 5, 2012.
Examination Report from the Singapore patent application No. 2010092278 dated Jan. 7, 2013.
Official Action for Canadian Patent Application No. 2,726,601, dated Apr. 12, 2013, 3 pages.
Second Office Action from Chinese patent application No. 200980122613.X, dated May 9, 2013.
First Office Action from the Japanese patent application No. 2012527988, dated May 14, 2013.
Office Action from the Japanese patent application No. 2012527994 dated Jun. 11, 2013.
Second Office Action for Canadian Patent Application No. 2,726,707, dated Jul. 3, 2013, 3 pages.
Office Action from Chinese patent application No. 200980122835.1 dated Sep. 24, 2013.
International Search Report and Written Opinion of Application No. PCT/US2012/061281, dated Jan. 22, 2013.
Office Action from Chinese patent 200110213726.X dated Nov. 29, 2013.
International Search Report and Written Opinion of Application No. PCT/US2010/047744 dated Dec. 10, 2010.
Rejection Notice from JP 2011-514611, dated Aug. 20, 2012, 5 pgs.
Chinese Office Action from CN200980122761.1, dated Dec. 12, 2013.
The third Office Action from Chinese patent Application No. 200580014212.4, dated Dec. 19, 2008.
The International Search Report and Written Opinion in Application No. PCT/US2009/003616, dated Jan. 13, 2010.
First Examination Report for Indian patent application No. 4676/CHENP/2006 dated Apr. 17, 2009.
The fourth Office Action from Chinese patent application No. 200580014212.4 issued on Jul. 24, 2009.
Official Letter from Mexican patent application No. PA/A/2006/013488 dated Jun. 25, 2009.
Second Examination Report for Indian patent application No. 4676/CHENP/2006 dated Apr. 8, 2010.
Search Report and Written Opinion for international patent application No. PCT/US2009/002476, dated Apr. 21, 2009.
Third Office Action from Chinese patent application No. 200580006438.X, dated Sep. 28, 2009.
Second Official Action from Russian patent application No. 2008116682, dated Apr. 13, 2009.
First Official Action from Russian patent application No. 2006134646, dated Mar. 12, 2008.
Notification on Results of Examining the Invention for Patentability from Russian patent application No. 2006145434 dated Aug. 1, 2008.
First Rejection Notice issued for Japanese patent application No. 2007-527282 dated Dec. 14, 2009.
Second Office Action from Russian patent application No. 2006145434 dated Apr. 2, 2008.
First Office Action from Chinese Patent Application No. 2005800142124 dated Mar. 14, 2008.
First Official Action from Russian patent application 2008116682, dated Jan. 16, 2009.
Second Office Action from Chinese patent application 200580006438.X, dated Apr. 10, 2009.
Conclusion and Notification on Rehearing for Russian Patent Application No. 2006145434/09, dated Sep. 17, 2012.
The International Search Report from PCT Application No. PCT/US2011/047026, dated Jul. 11, 2011, 4 pgs.
The Written Opinion from International Search Report from PCT Application No. PCT/US2011/047026, dated Jul. 11, 2011, 8 pgs.
Office Action from corresponding European Application No. EP 09767062.4, dated Jul. 13, 2011, 5 pgs.
Office Action from Chinese patent Application No. 200580006438.X transmitted Jul. 9, 2008.
The second Office Action from Chinese patent Application No. 2005800142124 filed May 5, 2005.
"Wireless R&D Aims to Boost Traffic," by M. Moore, InTech with Industrial Computing, Feb. 2002, pp. 40-41.
"System Checks Faraway Machines' Health," by J. Strothman, InTech with Industrial Computing, Feb. 2002, pp. 42-43.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. ii, iii, iv and 1-12, Dec. 2003.
U.S. Appl. No. 12/485,169, filed Jun. 16, 2009.
U.S. Appl. No. 12/485,189, filed Jun. 16, 2009.
U.S. Appl. No. 12/486,282, filed Jun. 17, 2009.
U.S. Appl. No. 12/486,269, filed Jun. 17, 2009.
U.S. Appl. No. 12/486,253, filed Jun. 17, 2009.
The International Search Report and Written Opinion in Application No. PCT/US2009/003619, dated Sep. 30, 2009.
Office Action from Chinese patent Application No. 2005800142124, dated Mar. 14, 2008.
Office Action from Chinese patent Application No. 200580006438. X, filed Mar. 2, 2005.
Examiner's Consultation from European patent Application No. 05724190.3, dated Jun. 30, 2008.
The Official Communication in Application No. 2006/145434, filed May 5, 2005.
Office Action from European Application No. 05746241.8, dated Aug. 29, 2007.
"Wireless R&D Aims to Boos Traffic,"by M. Moore, InTech with Industrial Computing, Feb. 2002, pp. 40-41.
"System Checks Farawy Machines' Health," by J. Strothman, InTech with Industrial Computing, Feb. 2002, pp. 42-43.
"Quad Analog Output Module Installation and User's Manual", by Honeywell International Inc., Phoenix, Arizona, pgs. Ii, iii, iv and 1-12, Dec. 2003.
International Search Report and Written Opinion of Application No. PCT/US2005/015848, file May 5, 2005.

(56) References Cited

OTHER PUBLICATIONS

"Wireless Dual Analog Input Interface Transmitter Installation and User's Manual", by Honeywell International Inc., Phoenix, Arizona, pgs. Ii-vi and 7-43, Dec. 2003.

"XYR 5000 Wireless Dual Analog Input Interface, Model Selection Guide", by Honeywell International Inc., Phoenix, Arizona, Dec. 2003.

"Wireless Measure, Monitor & Control", by Accutech, 4 pgs. May 2003.

"Wireless Instrumentation, Multi-Input Field Unit", by Accutech, 2 pgs., Dec. 2003.

"Quad Analog Output Module", by Accutech, 1 pg. Dec. 2003.

3 Pages from Website www.chemicalprocessing.com, Apr. 2004.

International Search Report for International Application No. PCT/US 03/27561, filed Mar. 9, 2003, dated Jun. 15, 2004.

2002 Microchip Technology Inc., "Stand-Alone CAN Controller with SPI™ Interface," pp. 1-75, Mar. 1, 2002.

Rosemount Reference Manual 00809-0100-4022, Rev AA, Jul. 2002, "Model 4600 Oil & Gas Panel Transmitter," 65 pages.

Transmitter Schematic, Sold Jul. 2002, 5 pages.

Notification of Transmittal of the International Search Report and the Written Opinion of the International Searching Authority for International Application No. PCT/US2005/007328 filed Mar. 7, 2005. Date of Mailing: Jan. 12, 2006.

4 Pages from Website http://content.honeywell.com/imc/eznews/eznews0403/news.htm, 2004.

Notification of Transmittal of the International Search Report and the Written Opinion of the International Searching Authority for International Application No. PCT/US2006/025206 filed Jun. 27, 2006.

"Mechatronic Drives in Mobile Hydraulics," Internet Article, Soncebox News. No. 4, Oct. 2004.

U.S. Appl. No. 61/012,262, filed Dec. 7, 2007.

U.S. Appl. No. 60/937,396, filed Jun. 26, 2007.

U.S. Appl. No. 60/937,397, filed Jun. 26, 2007.

Office Action from European Application No. 05853808.3, dated Nov. 5, 2007.

Office Action from U.S. Patent Office in U.S. Appl. No. 11/028,486, dated Nov. 13, 2007.

"Written Opinion of the International Searching Authority" for PCT/US2008/011451 filed Oct. 3, 2008; date stamped Mar. 31, 2009; 10 pages.

"Notification of Transmittal of the International Search Report and The Written Opinion of The International Searching Authority" for PCT/US2008/011451 filed Oct. 3, 2008; date mailed Mar. 30, 2009; 3 pages.

"International Search Report" for PCT/US2008/011451 filed Oct. 3, 2008; date stamped Mar. 31, 2009; 4 pages.

The International Search Report and Written Opinion in Appln No: PCT/US2005/021757, filed Jun. 21, 2005.

The International Search Report and Written Opinion in Application No. PCT/US2006/035728, filed Sep. 13, 2006.

The International Search Report and Written Opinion in Application No. PCT/US2009/003636, dated Oct. 6, 2009.

The International Search Report and Written Opinion in Application No. PCT/US2009/003611, dated Nov. 4, 2009.

The International Search Report and Written Opinion in Application No. PCT/US2009/003621, dated Sep. 30, 2009.

Summons to attend oral proceedings for the European application No. 05746241.8 dated May 26, 2010.

The sixth Office Action from Chinese application No. 2005800014212.4, dated Aug. 17, 2010.

Rejection Notice for Japanese patent application No. 2007527282, dated Jul. 28, 2010.

First Office Action for Chinese application No. 200780018710.5 dated May 12, 2010.

Notification of Transmittal of the International Search Report and the Written Opinion of the International patent application No. PCT/US2010/047463 dated Dec. 1, 2010.

Third Office Action from Chinese App No. 2500680015575.4 dated May 11, 2010.

Communication from EPO App No. 06774208.0 dated Apr. 16, 2010.

Second Office Action from Chinese App No. 200670015575.4 dated Sep. 25, 2009.

Official Action from Russian App No. 2008103014; prior to Jan. 2010, 4 pages.

First Office Action from Chinese App No. 200680015575.4 dated Oct. 31, 2008.

Communication for EPO Application No. 06774208.1 dated Feb. 29, 2008.

First Office action from Japanese Application No. 20008-518521 dated Aug. 24, 2010.

The Official Communication in Application No. 05746241.8 date May 26, 2010.

Office Action from U.S. Patent Office in U.S. Appl. No. 11/028,486 dated May 9, 2008.

Notification of Transmittal of the International Search Report and Written Opinion, PCT/US2009/0036616, dated Jan. 13, 2010.

2002 Microchip Technology Inc., "Stand Alone CAN Controller with SPITM Interface," p. 1-75, Mar. 3, 2002.

Notification of Transmittal of the International Search Report, or the Declaration of PCT/US2003/10403, filed Apr. 4, 2003.

Notification of Transmittal of the International Search Report and the Written Opinion of PCT/US2005/021757, filed Jun. 21, 2005.

English Machine Translation of JP 2004208476 A, dated Jul. 22, 2004.

"High Power Single PSE Controller With Internal Switch," Linear Technology, LTC4263-1, LT 1007 REV A, Milpitas, California, pp. 1-20, 2007.

Notification of Transmittal of the International Search Report and the Written Opinion for PCT/2009/062152, filed May 27, 2009.

Office Action from related U.S. Appl. No. 10/878,235; date of Office action mailed Mar. 6, 2007; 7 pages.

Office Action from related U.S. Appl. No. 10/878,235; date of Office action mailed Sep. 13, 2006; 6 pages.

Office Action from related U.S. Appl. No. 10/878,235; date of Office action mailed Mar. 8, 2006; 5 pages.

Fourth Chinese Office Action for Chinese Patent Application No. 200980122835.1, dated Apr. 9, 2014, 21 pages.

* cited by examiner

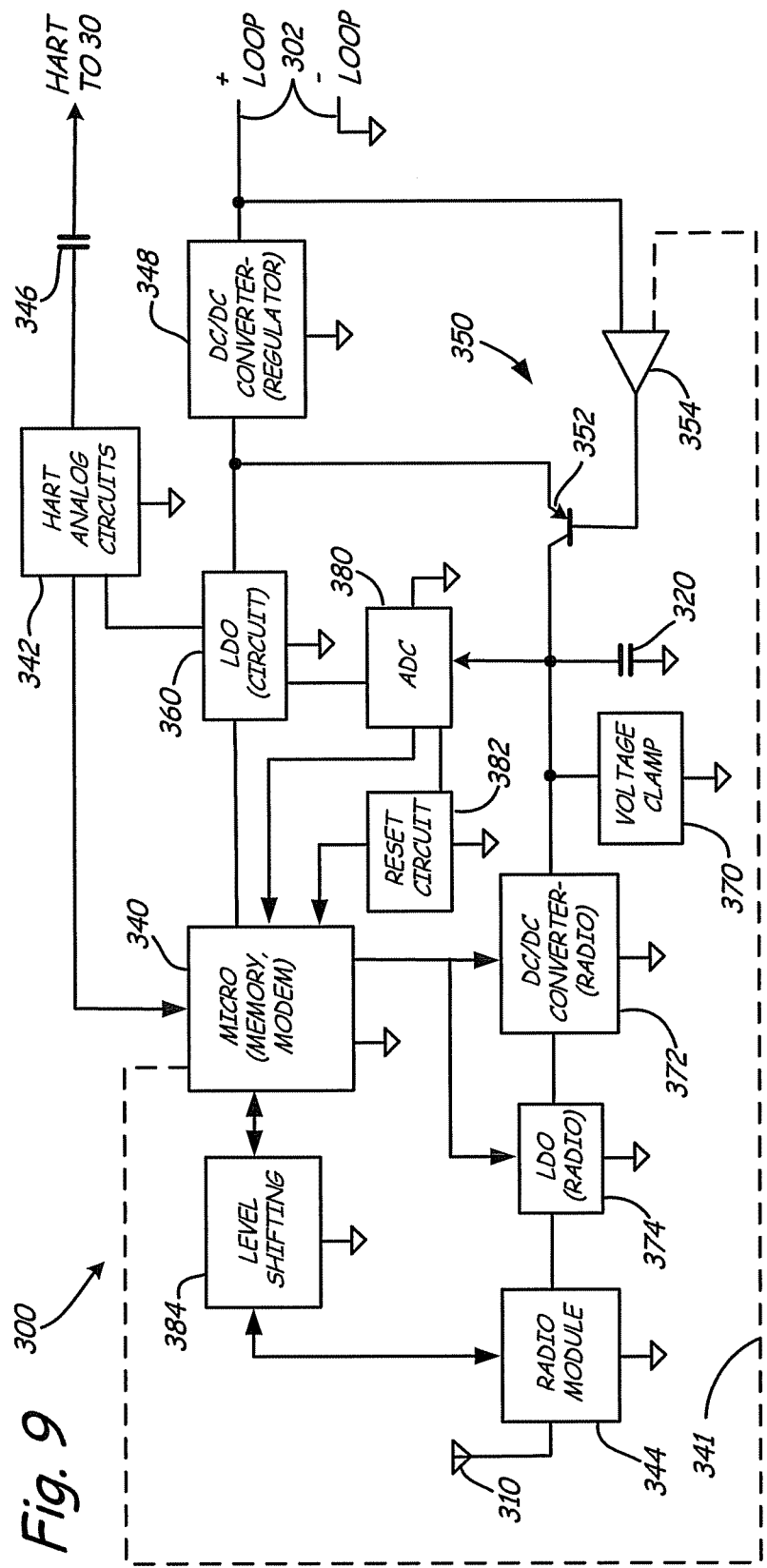

US 8,787,848 B2

RF ADAPTER FOR FIELD DEVICE WITH LOW VOLTAGE INTRINSIC SAFETY CLAMPING

CROSS-REFERENCE TO RELATED APPLICATION

The present application claims the benefit of U.S. Provisional patent application Ser. No. 61/073,094, filed Jun. 17, 2008; the present application is also a Continuation-In-Part of U.S. patent application Ser. No. 12/125,187, filed May 22, 2008 which claims the benefit of U.S. Provisional Patent application Ser. No. 60/997,760, filed on Oct. 5, 2007; U.S. patent application Ser. No. 12/125,187 is also a Continuation-In-Part of U.S. patent application Ser. No. 11/842,356, filed Aug. 21, 2007; which is a Continuation of U.S. patent application Ser. No. 10/878,235, filed on Jun. 28, 2004; which is now U.S. Pat. No. 7,262,693, the contents of which is hereby incorporated by reference in their entirety.

BACKGROUND OF THE INVENTION

The present invention relates to industrial process control or monitoring systems. More specifically, the present invention relates to field devices in such systems which are capable of Radio Frequency (RF) communication.

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices currently known, or yet to be known, used in the measurement, control and monitoring of industrial processes.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by controlling the magnitude of the current through the loop. In addition to, or in the alternative, the process control loop can carry digital signals used for communication with field devices.

In some installations, wireless technologies have begun to be used to communicate with field devices. For example, completely wireless installations are used in which the field device uses a battery, solar cell, or other technique to obtain power without any sort of wired connection. However, the majority of field devices are hardwired to a process control room and do not use wireless communication techniques. Further, in many field installations, "intrinsic safety" standards must be implemented which limit the amount of stored energy which can be discharged into the environment.

SUMMARY OF THE INVENTION

An adapter for coupling to a process control transmitter of the type used to monitor a process variable in an industrial process includes a first connection configured to couple to a first side of a two wire process control loop, a second connection configured to couple to a second side of the two wire process control loop and in series with a first connection to a process control transmitter, and a third connection configured to couple to a second connection of the process control transmitter. Wireless communication circuitry is coupled to at least the third connection and is configured to provide wireless communication for the process control transmitter. Intrinsic safety circuitry coupled to at least one of the first, second and third connections is configured to limit transfer of electrical energy to a value which is less than an intrinsic safety value.

BRIEF DESCRIPTION OF THE DRAWINGS

FIG. 9 is a simplified block diagram showing circuitry of a wireless communication adapter.

DETAILED DESCRIPTION OF ILLUSTRATIVE EMBODIMENTS

The present invention provides a field device and/or adapter configured to couple to a process control loop which further includes a wireless communication module for one way or bi-directional wireless communication. The wireless communication module can transmit and/or receive an RF signal from a remote device or location. The module can be directly powered with power received from the two-wire process control loop, or can be powered with power received from the process control loop and stored for subsequent use. The module can be a removable module in which the module need only couple to those field devices in which wireless communication is desired. The module can be configured as an adapter to retrofit an existing transmitter. Circuitry is provided for intrinsic safety protection.

Figure 1:
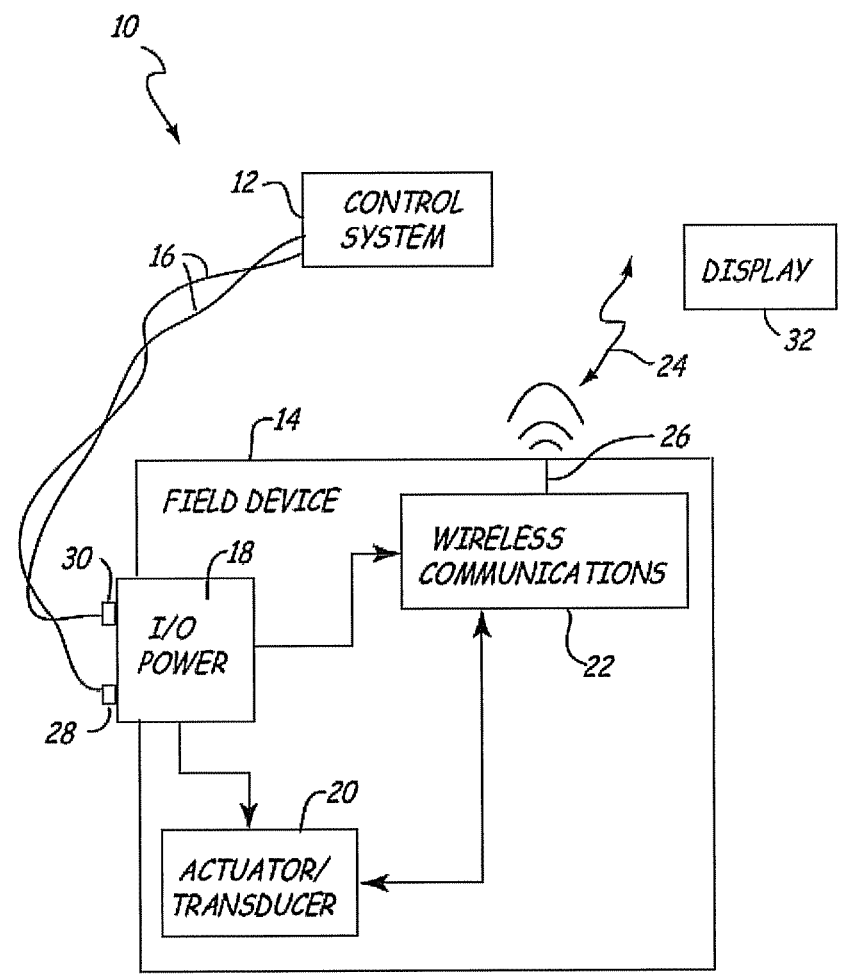
FIG. 1 is a simplified block diagram of a process control monitoring system including a field device configured for wireless communication.

FIG. 1 is a simplified block diagram of a process control or monitoring system 10 in which a control room or control system 12 couples to a field device 14 over a two-wire process control loop 16. The field device 14 includes I/O power circuitry 18, actuator/transducer 20 and wireless communication circuitry 22. The wireless communication circuitry 22 is configured to send and/or receive an RF signal 24 using an antenna 26.

Currently, industrial instrumentation often includes a local display or "meter" which can be used for local monitoring of process information. The meter can be quite useful in many installations, however, such a local display configuration does have several limitations. A local display requires direct visual access to the field device. Further, typically an operator can only view a single meter at a time. The instruments which contain the meter are often not at a convenient location or viewing angle. One technique which has been used to address such a configuration is the use of a meter which is wired to a process transmitter. This allows the meter to be mounted at a more convenient location. Another technique is shown and described in U.S. patent application Ser. No. 10/128,769, filed Apr. 22, 2002, entitled PROCESS TRANSMITTER WITH WIRELESS COMMUNICATION LINK.

Figure 2:
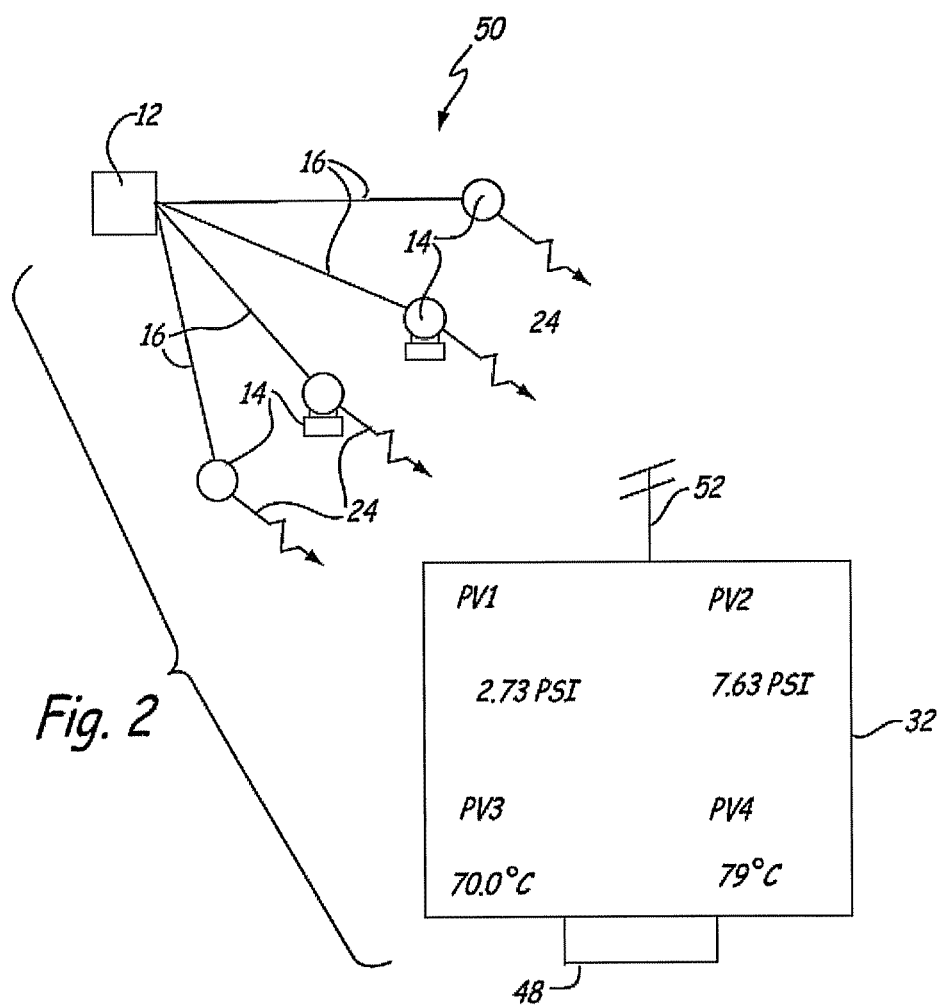
FIG. 2 is a block diagram of a process controller monitoring system in which multiple field devices transmit information to a remote meter.

With the present invention, an RF communication module is included in a field device, or configured as an adapter to retrofit a field device which can be used in addition to the connection to a process control loop such as loop 16. The wireless communication module 22 can be configured to be compact and lower power such that it can be easily included in existing field device configurations. The module can be used for wireless transmission of information for use in monitoring control and/or display of data. Such a radio transmitter can make the field device information available in a local area. For example, a single local display such as display 32 can be provided and used to display information from the field device 14. The display 32 can be configured to display information from several devices, either simultaneously, sequentially, or through commands provided to the display, for example using a manual input such as buttons available to an operator. The display 32 can be placed at a fixed location or can be a portable device such that it can be carried throughout the process control system to monitor and observe operation of various field devices. Depending on the strength of the RF signal 24 and the sensitivity of the transmit and receive circuitry, the area covered by the RF transmission can be controlled as desired. For example, FIG. 2 is a simplified diagram of a process control system 50 in which a number of field devices 14 are coupled to the control room 12 through individual process control loops 16. Each field device 14 transmits an RF signal 24 for receipt by display 32. In this example, display 32 is capable of displaying four process variables (PV1, PV2, PV3 and PV4) which are received from the field devices 14 using antenna 52. As mentioned above, the display 32 can be a fixed display or can be a portable display, such as a hand held unit. In this particular configuration, the display 32 is illustrated as showing two process variables which relate to process pressure and two process variables which relate to process temperature. This allows the field devices 14 to provide information over the RF connection within a desired range, for example, within a local area. For example, if the display 32 is within 40 meters of a field device 14, it will be capable of receiving and displaying information from that field device. An optional user input 48 can be used to, for example, select the format of the display, the process variable displayed, or used to interrogate a field device 14.

Figure 3:
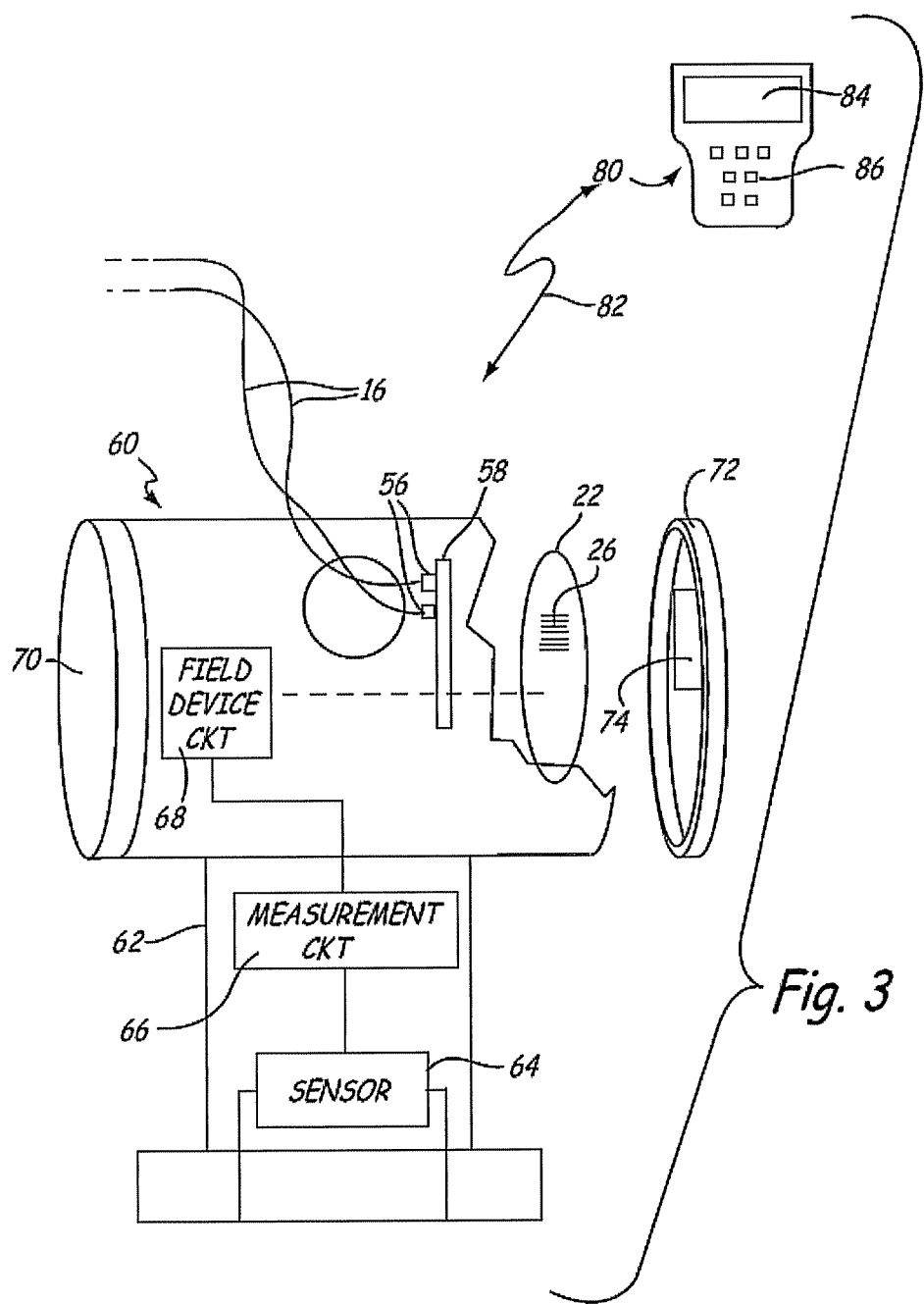
FIG. 3 is an exploded cut away view of a field device including wireless communication circuitry for communicating with a remote device such as a hand held unit.

FIG. 3 is a simplified cutaway partially exploded view of a pressure transmitter 60 which is one example of a field device. Pressure transmitter 60 couples to two-wire process control loop 16 and includes a transmitter housing 62. Process control loop 16 couples to terminals 56 carried on terminal board 58. A pressure sensor 64 provides one example of a transducer and is configured to couple to a process fitting to measure a differential pressure occurring in a process fluid. The output from the sensor 64 is provided to measurement circuitry 66 which couples to field device circuit 68. The field device circuit 68 implements aspects of the I/O power supply 18 shown in FIG. 1. The wireless communication circuitry 22 couples to field device circuit 68 and may, in some embodiments, couple to process control loop 16.

The housing 62 includes end caps 70 and 72 which can be screwed into the housing 62. End cap 72 includes an RF transparent window 74 configured to align generally with an antenna 26 carried on wireless communication circuit 22. When attached, the end caps provide a intrinsically safe enclosure for circuitry within transmitter 60. The materials typically used in end caps, for example metal, are not transparent to RF signals. However, RF transparent window 74 allows RF signals to be sent from or received by antenna 26. One example RF transparent material for use with window 74 is glass or the like. However, any appropriate material can be used. The window and housing configuration can help to meet intrinsic safety requirements and provide flame proof (explosion proof) capability. Further, the cavity within housing 62 can be configured to provide a desired radiation pattern of RF signals generated by antenna 26. For example, it may be desirable to have the RF transmission be directional in some implementations, or omnidirectional in others. In other implementations, the cover 62 can be lengthened to provide an additional interior cavity for placement of wireless communication circuit 22.

The wireless communication circuitry 22 can be selected as desired. One example circuit is the "I-Bean" transmitter device available from Millennial Net. However, other circuitry can be used. Analog or digital signals carried on process control loop 16 can be read and transmitted using the wireless communication circuit 22 without disrupting operation of the process control loop 16 or field device circuitry 68. The circuitry used for wireless transmission should be sufficiently small and low powered to fit within the physical and power constraints of process field devices. Some prior art transmitters are configured to receive an optional display arranged generally in the position shown for wireless communication circuit 22 in FIG. 3. In such a configuration, the wireless communication circuit 22 can be used in place of the local display. In such a configuration, the communication wireless circuitry 22 simply transmits an RF signal which couples directly to the process control loop 16 and transmits an RF signal which corresponds to any analog and/or digital signals carried on the loop 16.

In general, the process control loop discussed herein can comprise any type of process control loop for use in industrial process control and monitoring systems. Such loops include 4-20 mA current loops in which a analog current level is varied between 4 and 20 mA to transmit information. The same control loop can be used to provide power to the field device. Another type of process control loop is in accordance with the HART® communication protocol in which digital transmissions are superimposed on the 4-20 mA signal for transmission of additional information. Another example two-wire process control loop uses a protocol set forth by the Instrument Society of America (ISA) which is called the Field Bus SP50 protocol. However, end signaling protocol can be used. Some process control loops are configured to connect to multiple field devices such that the field devices can communicate with one another or monitor transmissions from another field device. In general, any type of information transmitted on such process control loops, or available or generated internally or received by a field device, or otherwise used to control a field device or other type of information, can be transmitted using the wireless communication techniques of the present invention. In another example, a hand held unit or device used to configure field devices can be carried into the field by an operator. The operator uses the hand held device to send or receive information to a field device when the hand held device is within proximity of the field device. This allows the operator to gather information or program a field device without having to physically couple to the device or the physical process control loop.

In some embodiments, it is also desirable for communications from a field device, or to a field device, to carry addressing information. The addressing information can be indicative of the source of the transmission or the intended recipient of the transmission. The wireless communication circuitry can transmit continuously or on a periodic or intermittent basis, as desired. In another example, the wireless communication circuitry only transmits when activated or "polled". The activation can be from a source internal to the field device, received through the process control loop, received from a wireless source, or received or generated by another source. In environments in which multiple field devices may transmit simultaneously, the transmission protocol should be selected to avoid or address any type of collisions which might interfere with the transmissions. For example, different frequencies or frequency skipping techniques can be used, random or semi-random transmission windows can be used, repeated transmissions or token based techniques can be implemented or other collision avoidance techniques as desired. If the transmission includes error detection or correction information, this information can be used to detect an error in the transmission and/or correct any errors in the transmissions. If an error is not correctable, the receiving unit can request a re-transmission of the corrupt data or, can indicate an error, or can wait for a subsequent transmission of the data, or take other steps as desired.

FIG. 3 also shows an example hand held device 80 for communication with circuitry 22 over RF connection 82. Hand held device 80 includes a display 84 and user input 86. Other types of inputs and outputs can be included in hand held device 80. Preferably, the hand held device 80 is battery operated and can be carried into the field by an operator for communication with field device 60. Information from the field device 60, or from other sources, is displayed on display 84 and the hand held device is controlled using input 86. Commands or other information can be transmitted by the hand held device 80 to field device 60.

In one configuration, the wireless communication circuitry requires power which is within the power constraints available in the field device. For example, one display currently used within field devices uses 3.6 volts at 0.5 mA. If a transmitter which is capable of operating an LCD meter is employed, the wireless communication circuitry can replace the LCD meter and use the same power source that is used to drive the LCD meter. In another example, the wireless communication circuitry is powered directly from the process control loop, for example using the voltage developed across a diode drop connected in series with the process control loop. In embodiments in which no battery is used with the communication circuitry, the circuitry can more easily meet intrinsic safety or other safety approval requirements and provide an indefinite field life without battery replacement or maintenance. In configurations in which the wireless configuration is only for sending information, power requirements can be reduced. In another example, if a greater transmission range is desired, a stationary device such as display 32 as illustrated in FIG. 1 can include an RF repeater for re-transmission of data received from, or sent to, a field device. The RF repeater can be loop powered, or can derive its power from other sources. Further, once the RF data is received, it can be reformatted for transmission over other medium, for example an Ethernet connection, into existing data transmission structures used within process control systems, over an extended range RF communication link such as a cell phone, or relaying using another technique.

Figure 4:
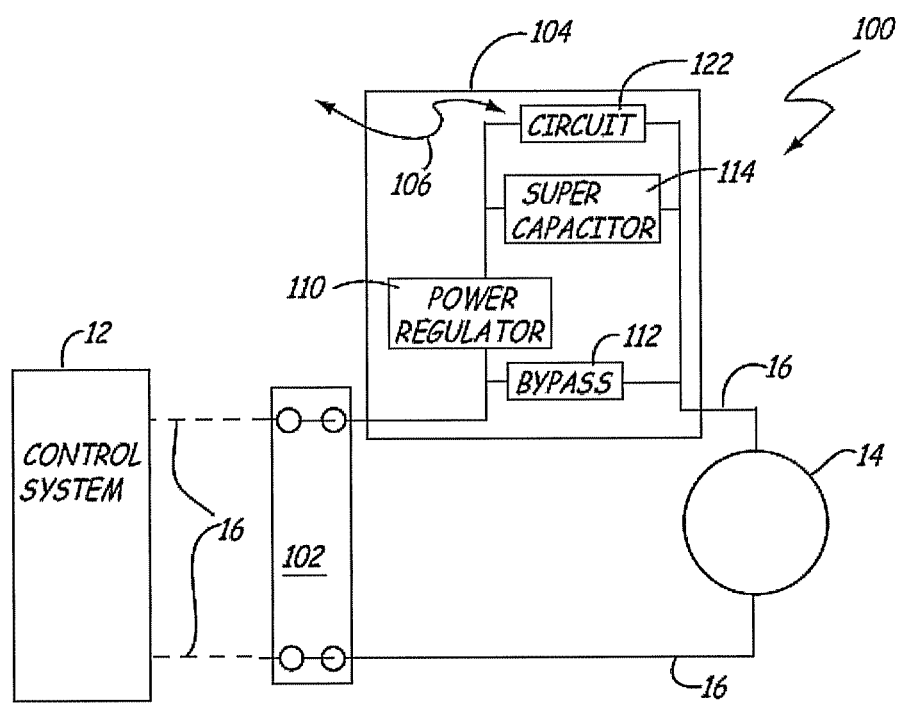
FIG. 4 is a diagram of a process controller monitoring system which includes a field device for wireless communication which scavenges power from the process control loop.

FIG. 4 is a simplified diagram of a process controller or monitoring system 100 which illustrates another aspect of the present invention. In system 100, a field device 14 connects to a control system 12 through process control loop 16 through junction box 102. In the embodiment of FIG. 4, a field device 104 couples to the process control loop 16 and includes wireless communication circuitry 122. The wireless communication circuitry 122 is configured to send an RF signal 106 and to be completely powered by power received from the process control loop 16.

Process device 104 includes a power regulator 110, a shunt or bypass 112, and a super capacitor 114. During operation, the super capacitor 114 is slowly charged (trickle charged) using a power regulator 110 by using excess voltage tapped from the process control loop 16. The bypass 112 allows loop 16 to operate normally and is connected in series with loop 16. Communication circuit 122 includes circuitry for receiving analog and/or digital information carried on process control loop 16. The circuit 122 can responsively transmit an RF signal 106 based upon the received information. If operated as a receiver, circuitry 122 is capable of modulating data onto the electrical current carried in the loop 16. This can be either analog or digital information. This configuration allows data to be relayed over a wireless communication network. The network can be configured in accordance with any type of topology, including point to point, spoke and hub and mesh topologies. Process device 104 can be positioned at any location along the loop including configured as an individual device such as that illustrated in FIG. 4. In some installations, the field device 104 should be field hardened and configured for intrinsically safe operation. The device 104 can also be positioned within another field device 14, as part of a junction box 102, or even located within the control room which houses control system 12. The field device 104 can connect to more than one RF circuit 122 and/or more than one process control loop 16, either simultaneously or through the use of multiplexers or other techniques.

The use of a super capacitor allows the device to operate without internal batteries or other techniques. The use of a capacitor allows quick charging and the storage of sufficiently large energy potentials. When used in a hazardous environment, large energy storage may not be acceptable in order to meet intrinsic safety standards. However, the process device 104 can be moved away from the hazardous environment, such as at the junction box 102, where intrinsic safety is not required.

Figure 5:
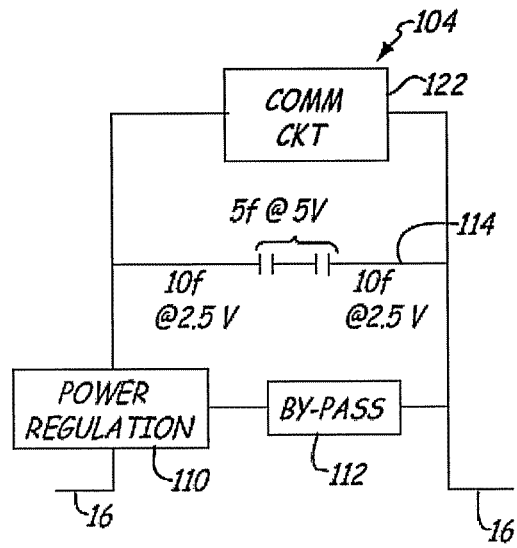
FIG. 5 is a more detailed schematic diagram of circuitry shown in FIG. 4.

FIG. 5 is a simplified schematic diagram of field device 104 showing super capacitor 114 in greater detail. In this example, super capacitor 114 comprises two 10 Farad capacitors configured to each carry a 2.5 volt potential. This yields an equivalent capacitance of 5 farads with a 5 volt potential drop. Assuming that the wireless communication circuit 122 is capable of operating at a voltage of between 4 and 5 volts, the available energy from each of the 5 Farad capacitors is $\frac{1}{2}*C(V_i^2-V_F^2)$ which is $\frac{1}{2}*5*(5^2-4^2)=22.5$ J.

Figure 6:
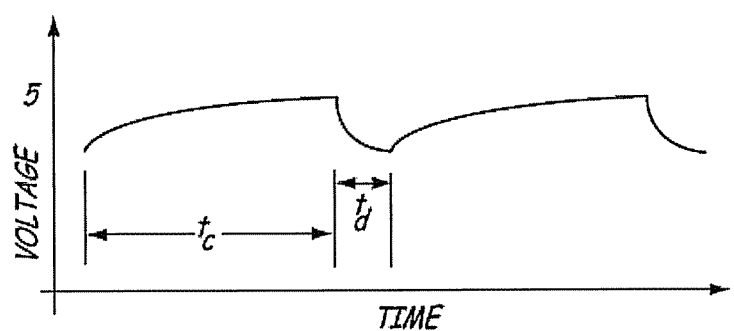
FIG. 6 is a graph of voltage versus time as measured across a capacitor shown in FIG. 5.

FIG. 6 is a graph of voltage versus time measured across super capacitor 114. In this example, 600 mW wireless transmitter which transmits a burst signal for a period of $t_d$ of 1 second will require 0.6 J/S*1 s=0.6 J of energy. Thus, there is ample energy available for operation of such a communication circuit 122.

A typical power supply used to provide power to a process control loop provides 24 volts DC. However, in a 4-20 mA system, a transmitter may only require 12 volts to operate. Wiring losses in the process control loop may cause 2 to 4 volts of voltage drop. Assuming only 5 volts is available for charging the super capacitor 114, and that the process control loop is operating at a low current level (i.e., 4 mA), there is still 20 mW available to charge the super capacitor 114. Because only 0.6 J was consumed during the transmit cycle, the available 20 mW will charge the super capacitor to full capacity in a time $t_c$=0.6 J/0.02 W=30 s. Therefore, such a configuration will be capable of transmitting a signal having a 1 second duration every 30 seconds. Assuming that the bandwidth of the communications signal is 200 Kb/s and a packet size of 200b, the burst time is reduced to one millisecond and the resulting transmit time is 0.03 seconds. In such a configuration, diagnostic data can easily be transmitted because it is not of a time critical nature. However, if sufficiently fast charge times are available, control and process variable signals can also be transmitted wirelessly.

Although a super capacitor is described, any energy storage device can be employed including a battery, or other. The energy that is used to charge the storage device can be electrical or magnetic and can be derived or collected from any source.

Figure 7:
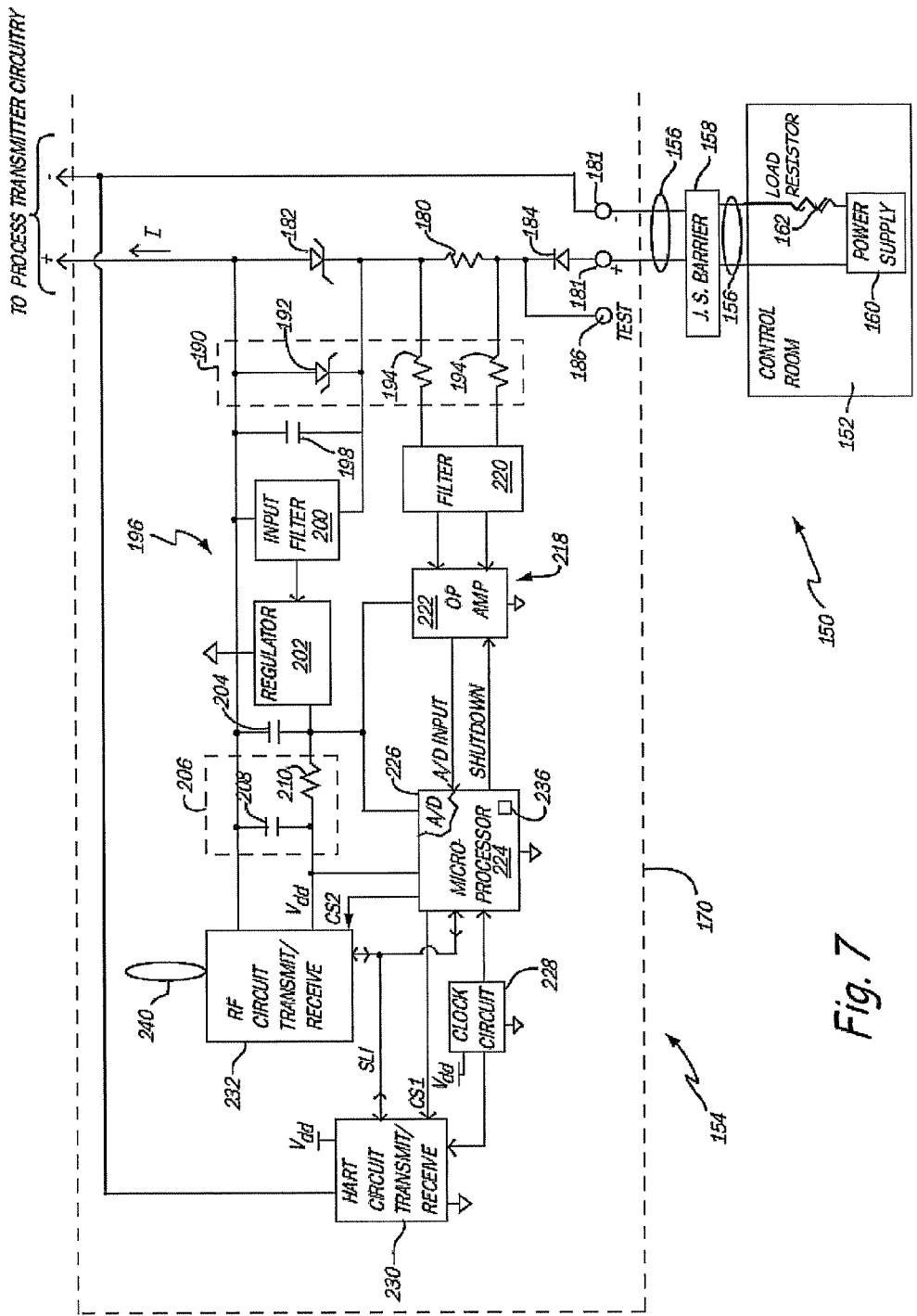
FIG. 7 is an electrical block diagram of circuitry for providing wireless communications in a process controller monitoring system.

FIG. 7 is a simplified diagram of process controller monitoring system 150 which includes a control room 152 coupled to a field device 154 through two-wire process control loop 156. Process control loop 156 extends across an intrinsic safety barrier 158. The control room 152 is modeled as including a power supply 160 and a load resistance 162.

The field device 154 can be of any configuration and is not limited to the specific schematic shown in FIG. 7. RF communication circuitry 170 is shown coupled in series with loop 156. Circuitry 170 can be implemented in a terminal block of a field device. For example, circuitry 170 can be configured as an add on module such that the two-wire process control loop 156 can connect to existing transmitter circuitry.

In the configuration illustrated in FIG. 7, the communication circuitry 170 enables wireless communication abilities to be added to a new or existing process control loop or field device. The circuitry is configured to be powered by the process control loop and can be installed anywhere in the loop ranging from the control room, anywhere along the loop itself, in the intrinsic safety (IS) barrier or junction box 158, as a stand alone field device, or included in another field device. The circuitry can be configured for any type of communication. However, in one simple configuration, the circuit 170 is configured to measure the current carried in process control loop 156 and transmit an output related to the measured current to a wireless receiver.

Turning now to one specific embodiment of circuitry 170 shown in FIG. 7, a sense resistance 180 and a power supply diode 182 couple in series with process control loop 156. The sense resistance 180 can be, for example, 10 ohms and is used in sensing the current level I carried in the process control loop 156. A test diode 184 is also coupled in series with the loop 156 and provides a test point 186. This can be used to calibrate or characterize a field device coupled to circuitry 170. An intrinsic safety protection circuit 190 is provided which includes diode 192 connected as shown across diode 182 and isolation resistors 194 connected at opposed ends of sense resistance 180. Diode 182 is part of a power supply 196 which includes capacitor 198, input filter 200, regulator 202, capacitor 204 and secondary filter 206. Secondary filter 206 includes capacitor 208 and resistor 210. The power supply circuitry 196 generates a power supply voltage $V_{DD}$ relative to a circuit ground for use by circuitry in measuring the loop current and wirelessly transmitting a resultant signal. Although a specific power supply implementation is shown, any appropriate power supply configuration or embodiment may be used as desired.

In this embodiment, input circuitry 218 includes sense resistance 180 and is configured to measure the current I flowing through loop 156. Input circuitry 218 also includes a filter 220 which provides a differential connection to an OP amp 222. The OP amp provides an amplified input signal to an analog to digital converter 226 which is illustrated as part of a microprocessor 224. A clock circuit 228 is provided and used to provide a clock signal to, for example, microprocessor 224. Optional HART® transmit and receive circuit 230 connects to microprocessor 224, loop 156, clock circuit 228 and an RF transmit/receive circuit 232. The optional HART® circuit 230 is configured to receive a digital chip select signal (CS1) from microprocessor 224. The RF circuit 232 is configured to receive a separate digital chip select signal (CS2) from microprocessor 224. Both the HART® circuit 230 and the RF circuit 232 are configured to communicate with the microprocessor 224 on an SCI bus, depending on which chip select is active. Microprocessor 224 is also configured to provide a shut down signal to operational amplifier 222. Microprocessor 224 includes a memory 236 which is used for storing programming instructions, temporary and permanent variables and other information and may include both volatile and non-volatile memory. The memory can include, for example, an EEPROM and can contain addressing information which uniquely identifies circuitry 170. RF circuit 232 couples to an antenna 240 which can be configured as an internal antenna, external antenna, or combination, as desired. Circuitry 170 is configured to couple across the two-wire process control loop 156 such that the loop 156 can terminate at another field device such as a process transmitter or process controller.

The circuitry 170 illustrated in FIG. 7 can be implemented on a single printed circuit board such that RF antenna 240 is formed integral with the board. This configuration allows the circuitry 170 to be easily implemented in existing field devices and does not require the use of an external antenna. This reduces installation complexity.

The optional HART® transmit/receive circuit 230 can be used to monitor digital signals, such as a process variable, carried on the process control loop 156. Based upon the sensed digital signal, the HART® circuitry 230 can control operation of the RF transmit/receive circuit 232 for transmission of information related to the sensed process variable, or other information. If the HART® circuitry is implemented in accordance with the complete HART® protocol and appropriate RF protocol stacks, the circuitry can implement gateway level functionality which will allow a HART® master to communicate in a bi-directional manner through the RF HART® gateway device with a HART® capable field device on the process control loop 156. This allows wireless communication with a field device for monitoring, configuration, diagnostics, or exchange of other information or data.

Frequently, in process control or monitoring installations, an operator is required to physically access a field device or the process control loop in order to exchange information with the field device. This allows the operator to repair equipment and do preventive maintenance on the equipment. The wireless communication configuration set forth herein allows the operator to interrogate field devices which may be in locations which are difficult to access. Further, even in configurations in which the field devices are easily accessible, the wireless communication circuitry does not require an operator to remove covers on equipment such as transmitters or junction boxes in order to expose loop wiring for physical connection to the process control loop. This can be particularly beneficial in hazardous locations where explosive gases or vapors may be present. A digital or analog process variable can be sensed by the wireless communication circuitry and transmitted to a wireless meter or hand held device as discussed above.

During operation, circuit 170 is placed in series with the process control loop 156 where it utilizes the 4-20 mA current flowing through the loop to power itself. For field devices that employ a common electrical ground, circuitry 170 can be inserted on the high voltage side of the loop connection. This configuration allows access to other bus circuitry within the field device such as a CAN interface. The configuration includes a test connection 186 for use in measuring loop current during testing. The sense resistance 180 is preferably configured to provide an equivalent capacitance of zero as measured at terminals 181 which connect to loop 156 in accordance with intrinsic safety standards. Circuitry 170 is configured for nominal operation at between 3 and 4 volts and the zener diode 182 along with sense resistance 180 sets this operating voltage. The excess voltage available on typical 4-20 mA current loop is sufficient to operate circuitry 170. Further, power management techniques can be employed to limit the current drawn from the loop to about 3 mA. This allows any field device connected to the process control loop to send an alarm level signal of 3.6 mA without collapsing the circuit by drawing more than the available current level.

Zener diode 182 acts as a shunt element which is placed in series with the loop 156 to develop a preregulated voltage on the input filter stage. Any portion of the loop current which is not used by circuitry 170 is shunted through zener diode 182. The input filter 200 can comprise capacitive, inductive and resistive elements and is used to isolate the loop from any noise or load fluctuation generated by circuitry 170. This also suppresses noise in the HART® extended frequency band in order to conform with HART® standards.

The voltage regulator 202 can be any appropriate voltage regulator such as, but not limited to linear or switch mode regulators and is used to supply the voltage $V_{DD}$ to the circuitry. Filter 206 is used to store energy and further decouples circuit loads from the regulator 202. The output voltage of the secondary filter 206 is allowed to sag by several hundred millivolts during circuit load changes. This allows peak current draws by the circuitry 172 to be averaged from the 4-20 mA current loop.

In this embodiment, the microprocessor 224 including A/D converter, along with the RF circuitry 232 and input circuitry 218 can be placed into a sleep mode or low power mode during periods of idle operation in order to reduce power drain. For example, at a selected interval such as every 10 seconds, an internal timer in the microprocessor can enable the measurement of the loop current by the A/D converter. The measurement circuitry is allowed to settle before the A/D conversion occurs. After the A/D conversion is completed, both the loop measurement circuitry and the A/D converter are turned off to conserve power. The microprocessor passes the measured value to the RF circuitry 232 for transmission. Upon completion of the transmission, the microprocessor and RF circuitry return to the low power mode until the next cycle. The microprocessor may even put itself to sleep temporarily to save power. Using these power management techniques, the microprocessor is able to manage overall current requirements of the circuit by staggering the load demands on the regulator stage.

Loop current measurement is achieved using the 10 ohm sense resistor 180 coupled in series with the 4-20 mA current loop 156 to measure the analog current level. The voltage developed across the sense resistor 180 is filtered to remove fluctuations due to HART® digital communications as well as any loop noise. An operational amplifier stage 222 provides further signal conditioning and the signal is passed to the A/D converter 226 of microprocessor 224.

The RF circuitry 232 can be any appropriate circuitry or configuration as desired. In one simple form, the RF circuitry 232 simply transmits a measured variable to a wireless receiver. The antenna 240 can be used to broadcast the RF signal and can be formed integral with the circuitry 170, for example in the form of traces routed around an outside edge of a circuit board. The RF circuitry 232 can, in some embodiments, include a wireless receiver such that the circuitry 232 can be configured as a transceiver. The same antenna 240 can be used for both transmission and reception if desired. A typical low powered transceiver may have a communication range of about 200 feet, however other ranges can be achieved using different power requirements, circuit sensitivity, antenna configuration, and the like. If the circuitry 170 is mounted in a metal enclosure, such as a field housing compartment of a transmitter, an RF transparent portion of the housing should be used to allow transmission and reception of signals from antenna 240. For example, as discussed above, a glass window can be used. Other example materials include any material which is sufficiently transmissive to RF signals including plastic, or other materials.

The addition of the optional HART® circuitry 230 allows the circuitry 170 to selectively listen to a HART® message on the 4-20 mA signal carried on the current loop 156. Information such as measured process variables, diagnostic information, or other information can be transmitted to a wireless receiver. Further, if the HART® circuitry 230 is configured to modulate a digital signal onto the process control loop, it can be used to remotely command or interrogate a field device coupled to the loop 156. For example, the HART® circuitry 230 can be configured to act as a secondary master on the 4-20 mA current loop. This, in conjunction with RF circuitry 232 configured as a full transceiver, enables bi-directional communication and configuration of field device from a wireless master unit, for example a hand held device 80 shown in FIG. 3.

Microprocessor 224 can also preferably be used to implement diagnostics functionality. Microprocessor 224 is configured to monitor the voltage and current characteristics of the process control loop 156, improper or problematic variations in current and voltage can be identified using diagnostic techniques and can be transmitted to a remote location, either wirelessly, or using the HART® transmission capabilities provided by circuitry 230, or by setting the current level carried on loop 156 to an alarm value or other pre-determined value.

Circuitry 170 is preferably configured to allow operation in hazardous locations and to meet the appropriate approval and specifications, such as intrinsic safety standards. For example, the intrinsic safety protection 190, along with intrinsically safety rated resistor 180 is used on the input to the circuitry 170. Using appropriate components and circuit layout, the addition of a redundant zener diode 192 in parallel with zener 182 provides a level of redundancy and limits the amount of voltage that can enter this circuit in an intrinsic safety protected system. Similarly, the sense resistor 180 can be used to limit the maximum current that can enter the circuit 170 and snub any discharge of stored energy from the circuit through its external terminals. This provides an equivalent capacitance of substantially zero. The loop measurement circuitry is further protected by two intrinsic safety rated high value resistors 194 connected between the two ends of the sense resistor 180 and the filter 220. Other circuit components can be protected from any outside energy sources by the use of potting material or the like which also prevents hazardous gases and vapors from reaching any internal storage elements and nodes in the circuitry 170. For other non-hazardous locations, intrinsic safety components may not be required.

There are a growing number of applications in industrial process plants that utilize the benefits of wireless communications in process transmitters. These transmitters may be monitoring process temperature, pressure, level, or flow. Reasons for providing wireless communications to these devices include the cost savings of installing hundreds or even thousands of feet of wire or to ease the task of "connecting" to and communicating with the process transmitter. For a wired communications system, any host whether it be a process control system, or a portable handheld communicator, must physically connect to wires that are connected to the process transmitter in order to communicate with it. In contrast, with a wireless communications system, the host may wirelessly "connect" to a desired process transmitter from any location in the process plant within communication range. Further, in a wired system, the user must remove the cover from the device in order to gain access to the terminals for connecting a handheld communicator to perform diagnostics or commissioning of the process transmitter. Removing the cover may require the user to take several safety precautions to ensure that the safety features of the process transmitter, or the facility, are not compromised. Further, removing the cover from a process transmitter may require special work procedures, or even process or partial plant shutdowns, if the transmitter is used in a potentially hazardous area in the process plant. A process transmitter with wireless communications capability does not require the removal of the cover, and the related procedures, in order to communicate either locally or from a distant location.

There are a large number of installed process transmitters that have "wired" HART® communications capability. In some instances, it may be desirable to add wireless communications capability to these devices without having the expense of purchasing and installing a new process transmitter with wireless communications built in. Preferably the device interfaces the existing HART® enabled process transmitter to a wireless network. This device can act as a communications translator, communicating via HART® to the existing process transmitters, and communicating over a wireless network to a wireless host or other remote monitoring or diagnostic system. Further, it is preferable that another power source for this communications module is not required. The module should operate from the same power that is already provided to the process transmitter, while not negatively impacting the power available for the process transmitter. This communication device may operate from solar power, but that is not practical in many installations. It may also operate off a battery. However, batteries have special safety drawbacks when used in process plants adding to their expense, and also require periodic replacement, making them undesirable.

Since process transmitters may be scattered across a process plant, it is convenient for the users if they can communicate on a wireless mesh network. A mesh network is one in which each wireless device may serve as a router for the other wireless devices. This ensures that each device in the network has the most reliable communications path back to the host. These communication paths are established when the network is initially established, as well as whenever a new device joins the network. In many instances, it may be desirable that a process control transmitter which is coupled to a two-wire process control loop be also able to communicate information on a wireless network. It may also be desirable that the device function as a router in a "mesh network." Further, in many instances it is preferable that the device operate using power from the process control loop rather than requiring a separate source of power.

Figure 8A:
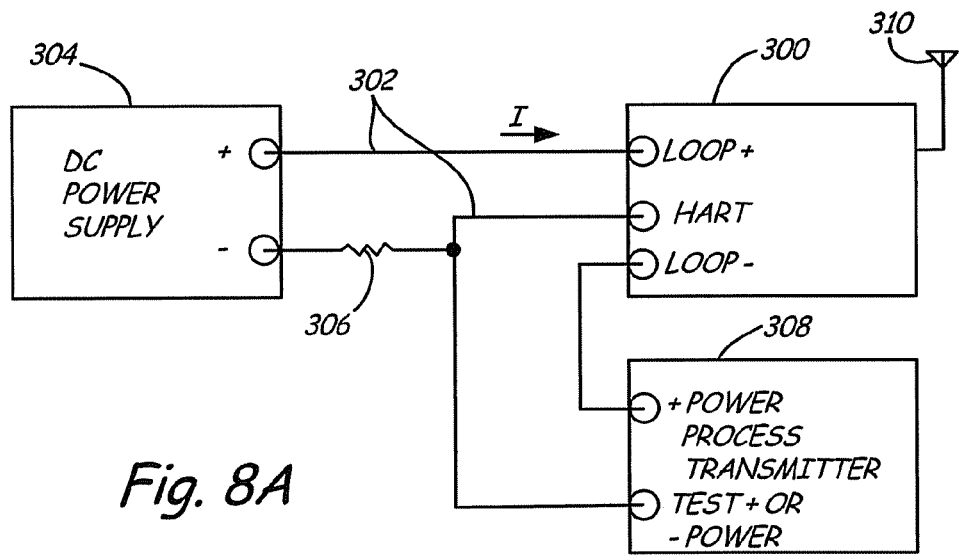
FIGS. 8A and 8B are block diagrams showing a wireless communication adapter coupled to a process variable transmitter through a two wire process control loop.
Figure 8B:
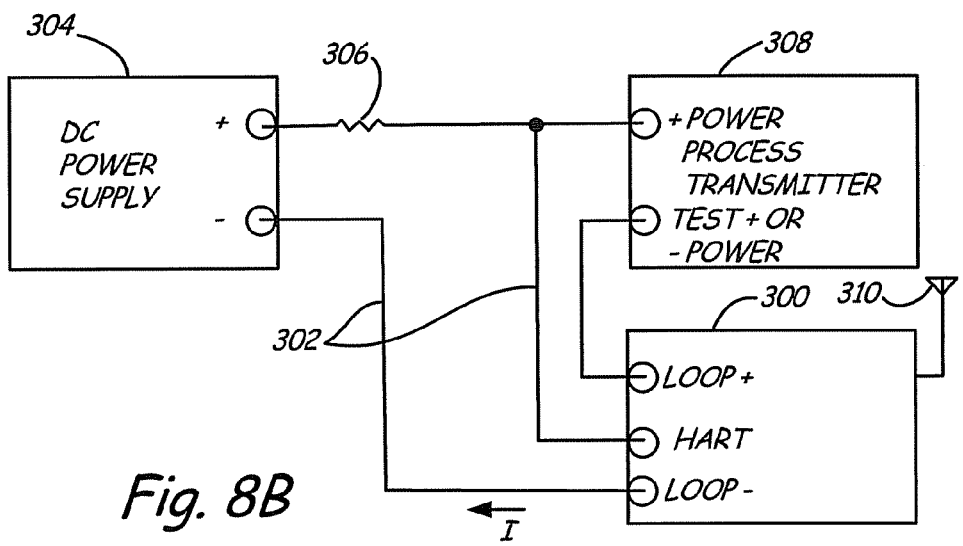

FIGS. 8A and 8B show two example wiring configurations for a wireless adapter 300 in accordance with one example embodiment. Wireless adapter 300 is shown coupled to a process control loop 302 which is powered by a DC power supply 304. The loop is illustrated as including a load resistance 306 and also couples to a process variable transmitter 308. In FIGS. 8A and 8B, the wireless adapter 300 includes two loop connections (Loop+ and Loop−) which connect in series with the process control loop 302. One of the loop connections couples to the power supply 304 while the other loop connection couples to a loop connection of the process transmitter 308. The wireless adapter 300 includes a third connection (labeled HART®) which couples to the other loop connection of the process transmitter 308. In the configuration shown in FIG. 8A, the Loop− connection of adapter 300 couples to the plus connection of transmitter 308 while the HART® connection of adapter 300 couples to the minus connection (labeled "Test+ or −Power") connection of transmitter 308. The arrangement in FIG. 8B is slightly different in which the Loop+ connection of the adapter 300 couples to the minus connection of transmitter 308 while the Loop− connection of adapter 300 couples to the power supply 304 and the HART® connection couples to the plus connection of transmitter 308. The adapter 300 is also illustrated with an antenna 310. In the configurations of FIGS. 8A and 8B, the adapter 300 is configured as a three terminal device through which all of the loop current I flows. The separate HART® connection is used to provide digital communication on the two wire process control loop 302. Although the Figures are labeled HART®, the adapter is not limited to operating in accordance with the HART® communication protocol and may use any appropriate protocol including Fieldbus protocols.

The adapter 300 is powered using power received from the process control loop 302. The loop 302 is also used to provide power to the transmitter 308. In one configuration, the adapter 300 regulates its voltage to a small value, for example 1.0 volts, such that it will have a minimal impact on the process control loop 302. The adapter 300 operates using the current available from the loop 302. For example, if the transmitter 308 sets the loop current to a value of 5 mA, the adapter 300 will operate on this 5 mA. If the voltage drop across the adapter is 1 volt, a total of 5 mW will be used by the adapter 300. In the case of a typical process variable transmitter, the loop current is varied between 4 mA and 20 mA based upon a measured process variable. Thus, the minimum power available to the adapter 300 will be about 4 mW and the maximum value available will be about 20 mW. The adapter 300 must utilize this power to perform all desired functions, including, communications on the loop 302 as well as wireless communications. A typical wireless radio may require up to a 3 volt supply and draw between 15 mA and 50 mA during communications (the specifics depend on many parameters related to the wireless network). As this current draw does not occur at all times, it is possible for the adapter to store power until it is needed to support the wireless communication. As discussed above, a super capacitor can be used to store power. These are relatively inexpensive and have relatively long life times. Super capacitors may supply current as high as 1 amp for short periods of time and may therefore be used to power the wireless communication circuitry.

FIG. 9 is a simplified block diagram of the adapter 300 which shows various circuitry blocks. A super capacitor 320 is illustrated and the device 300 is configured for HART® communication as well as wireless communication.

As illustrated in FIG. 9, adapter 300 includes a microcontroller 340 which also includes a memory and a modem for communication. The memory is used to store programming instructions, configuration data, variables, etc. HART® analog circuitry 342 is configured to couple to the process variable transmitter 308 through a DC blocking capacitor 346. A radio module 344 is provided to enable adapter 300 to communicate using RF communication techniques. A regulator 348 is provided which is configured as a DC to DC converter. A current shunt circuit 350 is connected in parallel with regulator 348 and includes a bypass transistor 352 controlled by a OP amp 354. OP amp 354 operates based upon a difference between a reference voltage ($V_{ref}$) and the voltage applied to the regulator 348. Regulator 348 provides a 2.3 volt output to a low dropout (LDO) regulator 360. Low dropout (LDO) regulator 360 provides a regulated 2 volt power supply output to the microprocessor 340, HART analog circuits 342, reset circuit 382 and ADC 380.

The current through bypass transistor 352 is used to charge the super capacitor 320. The voltage across the super capacitor 320 is set using a voltage clamp 370. For example, the voltage clamp can be set to 2.2 volts. Another DC to DC converter 372 is configured as a step up converter and provides a regulated voltage output of 3 volts to a low dropout (LDO) regulator 374. The output of low dropout (LDO) regulator 374 is set to 2.8 volts and used to provide regulated power to radio module 344.

The microprocessor 340 is connected to a analog to digital converter 380 which is used to monitor the voltage of super capacitor 320. Microprocessor 340 is also connected to a reset circuit 382. Microprocessor 340 provides data to the radio module 344 through a level shifting circuit 384.

It is preferable that the circuitry be able to support the maximum amount of wireless communication activity while dropping a minimum amount of voltage in the loop 302. Therefore, the adapter 300 is preferably configured to use power from the loop 302 in a very efficient manner. In one specific configuration, this can be achieved by using a low power microcontroller 340, for example, Texas Instruments MSP430F1481 and by using low power analog circuit components. These components can be powered by a low supply voltage to also minimize the total circuit power consumption. Further, the microcontroller 340 can be configured to enter a "sleep" mode if desired when certain functions are not needed, for example communication functions. In the configuration shown in FIG. 9, a separate modem is not utilized. Instead, the microcontroller 340 is used to provide modem functionality.

It is also preferable to provide the radio module 344 with a large amount of power. This allows more frequent communication and increased reliability. The additional power can be used to publish information from the transmitter 308, allow the adapter 300 to be used as a router for other process transmitters, for example in a mesh network and allow higher transmit power to be used. This can result in a more reliable mesh network, as the path from another wireless device through the adapter 300 to a host may be more reliable than the path which is directly from the device to the host.

In the embodiment of FIG. 9, the radio module 344 is powered by super capacitor 320. Therefore, in order to increase the power which is provided to the radio module 344, it is preferable to increase the power stored by super capacitor 320. In the configuration of FIG. 9, this is achieved by arranging the super capacitor 320 as a shunt element for the regulator 348 which regulates the voltage drop across the terminals which couple to loop 302 in conjunction with OP amp 354 and shunt transistor 352. In FIG. 9, the voltage across the loop terminals which couple to the process control loop 302 is regulated to one volt. This is achieved by adjusting the current going to the super capacitor using OP amp 354 and shunt transistor 352. In this configuration, regulator 348 operates in series with the loop 302 and is in the feedback loop formed by OP amp 354. In a less efficient configuration, a separate one volt shunt regulator and super capacitor charging circuit may be implemented. However, this requires additional components and additional power to operate. In contrast, in the configuration set forth in FIG. 9, any loop current which is not used by the circuitry of adapter 300 is directed into shunt capacitor 320 for increased efficiency. This results in the maximum amount of power being available for radio module 344. The voltage clamp 370 determines the voltage to which capacitor 320 is charged. Once the super capacitor 320 reaches the voltage set by the voltage clamp 370, the excess current flows through clamp 370 rather than into capacitor 320.

DC to DC converter 348 is configured as a low power "step up" switching regulator that operates with an input voltage of 1 volt. Regulator 348 increases the 1 volt input voltage to a sufficiently high voltage to power the remaining circuitry. In the example of FIG. 9, this is 2.3 volts. The converter can be a switched capacitor type converter, an inductor based boost converter, a transformer based converter or other appropriate configuration. The LDO regulator 360 regulates the 2.3 volt output from regulator 348 to 2.0 volts and removes any switching noise from the regulator 348. The output from the LDO regulator 360 is used to power the microprocessor 340, HART® analog circuits 342, memory, reset circuitry 382, and analog to digital converter 380.

HART® analog circuit block 342 can comprise, for example, a carrier detect circuit, a receive circuit and a transmit circuit. Preferably, these circuits are configured to have low power requirements while maintaining acceptable communications integrity. The memory in microprocessor 340 can be used to store programming code and temporary variables. Timers which are internal to microprocessor 340 can be used to provide a "software" modem functionality. The memory of the microprocessor 340 may include internal flash memory, RAM as well as EEPROM or other non volatile memory. The microcontroller 340 can be configured to monitor the voltage access super capacitor 320 using analog to digital converter 380 which provides a digital output to microcontroller 340 representative of the capacitive voltage. If desired, the microcontroller 340 can be used to determine whether the capacitor has a sufficient voltage to support radio transmission. Reset circuit 382 can be used to ensure that microcontroller 340 does not operate when the voltage is insufficient. For example, the reset circuit 382 can be configured to reset, or turn on, the microcontroller 340 when the supply voltage from LDO regulator 360 reaches a sufficient voltage level. The circuitry can also be used to reset the microcontroller 340 if a power "glitch" occurs.

Radio module 344 operates on a stable voltage of 2.8 volts provided by LDO regulator 374. As discussed above, if the super capacitor 320 is charged to 2.2 volts, the DC to DC converter regulator 372 steps up the voltage to 3 volts. During use, the voltage on the super capacitor will decrease and the step up converter is needed. The LDO regulator 374 is used to provide a stable 2.8 volts to the radio module 344. Preferably, regulator 372 is configured to operate off a minimum voltage of about 1 volt up to a maximum voltage of about 2.2 volts. In some configurations, microcontroller 340 is configured to turn off circuitry of radio module 344 if the voltage on the super capacitor 320 is less than 1 volt.

Microcontroller 340 can be configured to transmit information wirelessly using the radio module 344 by communicating over digital communication lines between the radio module 344 and the microcontroller 340. As the microcontroller operates from a two volt power supply while the radio operates from a 2.8 power supply, the digital communication lines between the two components must be level shifted using level shifting circuitry 384. For example, this can be performed using very low power level translator circuits such as Texas Instruments SN74LVC2T45DCU.

In one configuration, the microcontroller 340 can be configured to adjust the voltage drop across the loop terminals which couple to loop 302. For example, an optional control line 341 from the microcontroller 340 can be coupled to the inverting input of OP amp 354 of the shunt circuitry 350. In such a configuration, additional power may be made available to the radio by increasing the loop voltage drop under appropriate conditions. Similarly, if the impact on the process control loop of the circuitry of adapter 300 needs to be reduced, the voltage drop can be decreased. However, this will provide less power to the radio module and other circuitry of adapter 300 and may degrade performance.

Figure 10:
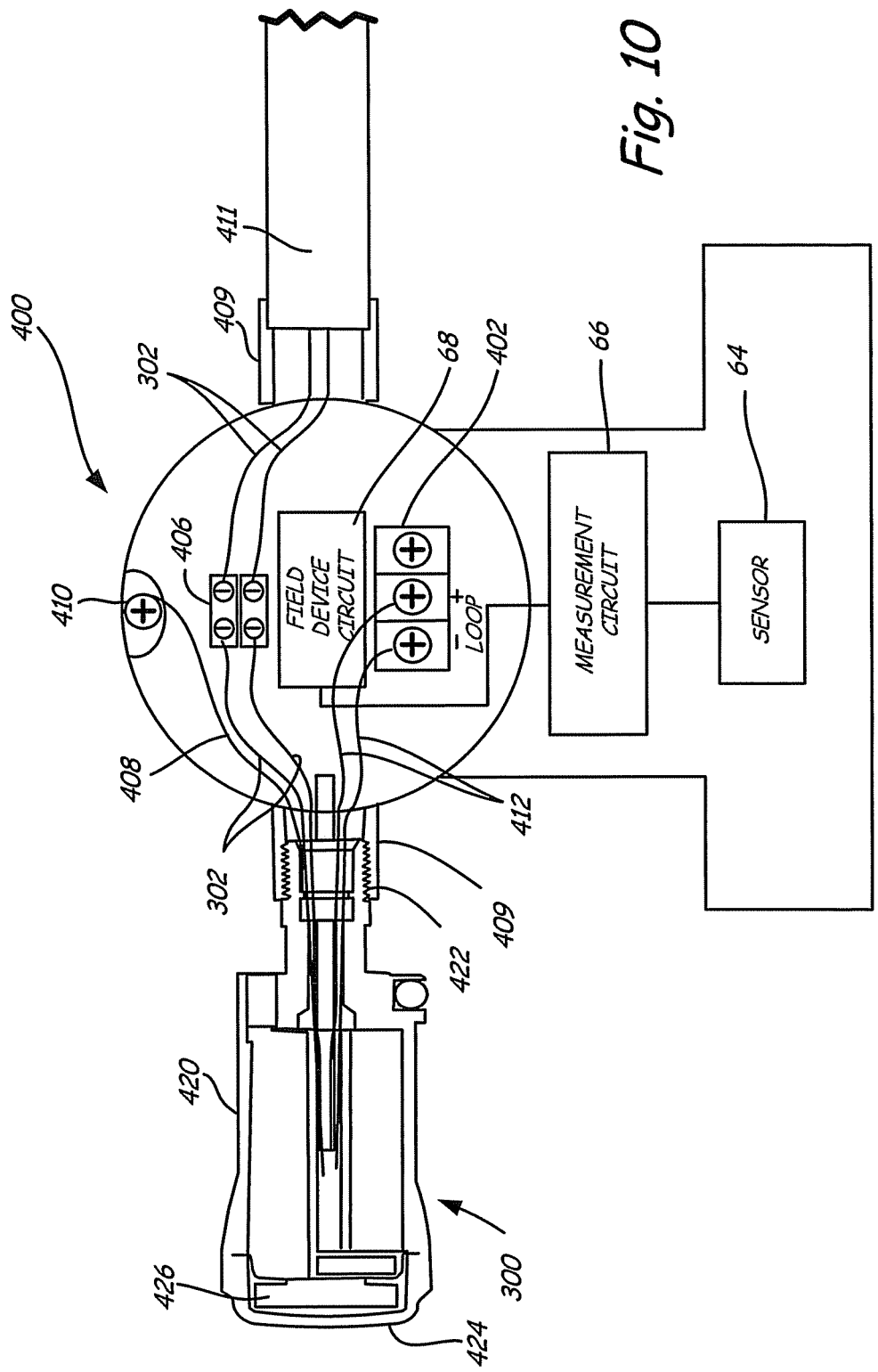
FIG. 10 is a simplified cross-sectional view showing a wireless adapter coupled to a transmitter.

FIG. 10 is a cross-sectional view of one embodiment showing a process control transmitter 400 coupled to a wireless adapter 300. Transmitter 400 includes a sensor 64 and measurement circuitry 66 as discussed above. Measurement circuitry 66 couples to field device circuitry 68. Transmitter 400 couples to two wire process control loop 302 through a connection block 406 and the wireless adapter 300. Further, the wireless adapter 300 couples to the housing of transmitter 400. In the example shown in FIG. 10, the coupling is through a NPT conduit connection 409. A similar conduit connection 409 is also used to couple to conduit 411 for carrying the two wire process control loop 302 therethrough. The chassis of wireless adapter 300 couples to an electrical ground connection 410 of transmitter 400 through wire 408. The transmitter 400 includes a two wire process control loop connection block 402 which couples to connections 412 from wireless adapter 300. As illustrated in FIG. 10, the wireless adapter 300 can be threadably received in conduit connection 409. Housing 420 carries an antenna 426 to support circuitry of the wireless adapter 300. Further, an RF transparent end cap 424 can be sealably coupled to housing 420 and allow transmission of RF signals therethrough. Note that in the arrangement shown in FIG. 10, five electrical connections are provided to the RF adapter 300. These include four loop connections as illustrated in either FIG. 8A or 8B, along with an electrical ground connection.

As discussed above, in some installations it is important for field equipment such as a wireless adapter, to be intrinsically safe, that is, to be able to be operated in environments in which the atmosphere is flammable or explosive. For example, circuitry in the device can be configured to limit the amount of energy which the device is capable of storing and/or which the device is capable of discharging at any given time. As illustrated above, the wireless adapter is connected in series with a field device such as a process transmitter or control valve and operates using power drawn from the current flowing through the two wire process control loop. A small voltage drop occurs across the wireless adapter. This voltage drop may be as low as 1.0 volts. However, as the current flowing through the two wire process control loop may, in some instances, be as low as 3.5 mA, the instantaneous power available may be as low as 3.5 mW. However, in some configurations, the wireless adapter may require more power. For example, the device may require 60 mW of power (3 volts at 20 mA) in order to transmit a wireless message. Similarly, the power required to receive a wireless transmission may also exceed the instantaneous power which is available from the process control loop. Thus, it is desirable that the wireless adapter be able to store power internally for use when there is insufficient power instantaneously available from the two wire process control loop. Typically, the time required for wireless communication, both transmission and reception, is relatively short while the power available from the process control loop is available from a continual basis. This energy can be stored in a capacitor for subsequent use. A standard capacitor can be used or, in some configurations, a super capacitor having a capacitance greater than 0.22 F. However, a field device which is configured to store energy must contain circuitry to prevent excessive discharge of such energy if the device is desired to operate in an intrinsically safe manner. Although with a super capacitor, the amount of energy coming out of the device must be limited, even if the standard capacitor is employed intrinsic safety requirements still require limitations on the amount of energy coming into the device. The voltage across a given capacitance must be kept below a level that could result in the capacitance creating a spark if the capacitance underwent an instantaneous short circuit. Therefore, limiting the maximum voltage which can be applied to the device allows larger capacitance values to be used while still meeting intrinsic safety limitations.

Figure 11:
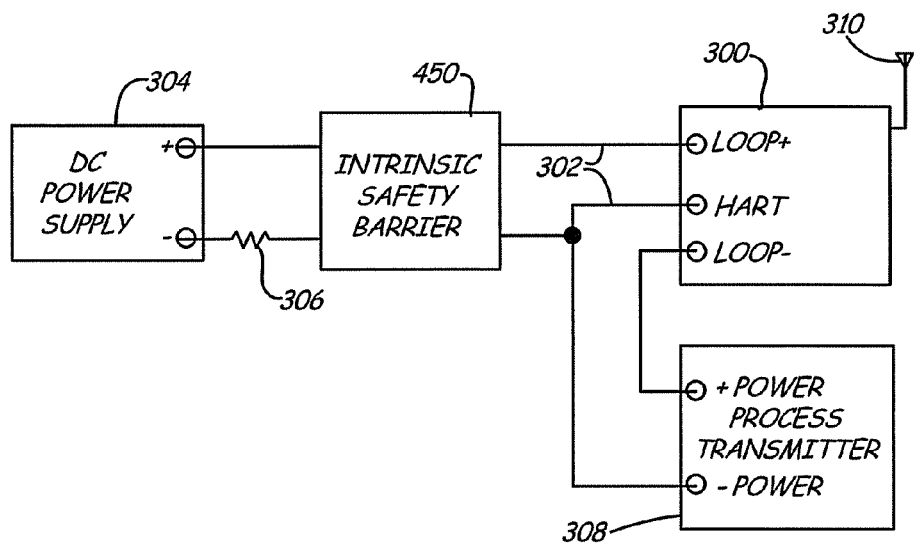
FIG. 11 is a simplified diagram showing a process control loop including an intrinsic safety barrier.

FIG. 11 is a simplified diagram similar to FIG. 8A showing the wireless adapter 300 coupled to a two wire process control loop 302. In FIG. 11, an intrinsic safety barrier 450 is shown as coupled to the two wire process control loop 302. Intrinsic safety barrier 450 limits the voltage and current which can be supplied to any field devices coupled to the loop from power supply 304. Further, in such a configuration, the field device, such as process transmitter 308 can be configured to limit the amount of energy which can be stored within its circuitry. However, as a capacitor, or a super capacitor is capable of storing power, additional circuitry must be provided to ensure that any power stored in adapter 300 cannot be discharged from the device. In another words, in order for a device coupled to process control loop to maintain intrinsic safety, the device must be configured such that any power which it can add back into the loop is limited. This can be particularly problematic if the device stores energy, for example, by using a capacitor.

In one aspect of the invention, circuitry is provided to limit the amount of power which the wireless adapter 300 is capable of discharging back into the process control loop 302 or elsewhere.

Figure 12:
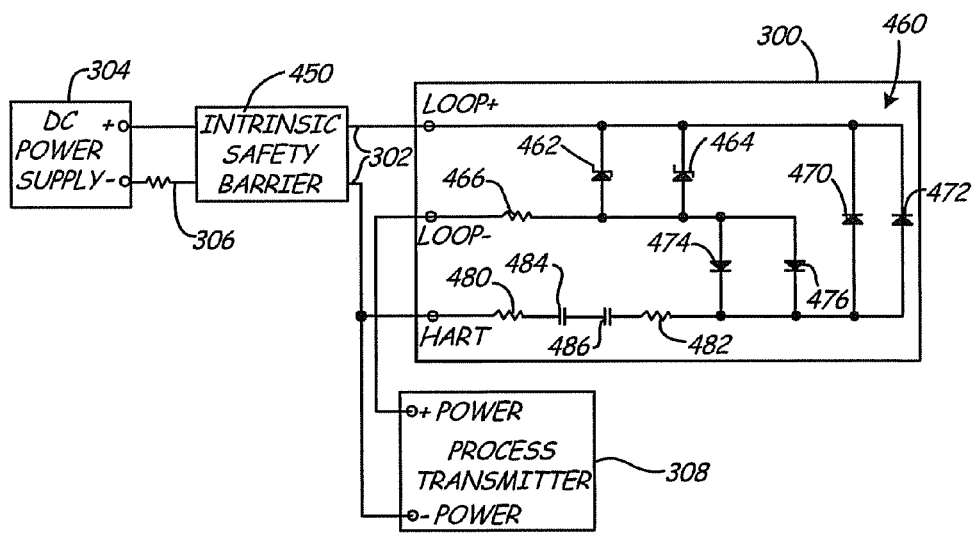
FIG. 12 is a simplified schematic diagram showing a wireless adapter including intrinsic safety circuitry.

FIG. 12 is a simplified block diagram showing wireless adapter 300 including one example configuration of intrinsic safety circuitry 460. In the example of FIG. 12, zener diodes 462 and 464 are provided which can comprise, for example, zener diode having a 6.2 volt bias voltage coupled across the loop+ and loop− connections. A 5 ohm resistance 466 is coupled in series with the two wire process control loop 302. Diodes 470 and 472 are coupled across the loop+ connection and the HART® connection to the field device 308. Similarly, diodes 474 and 476 are coupled across the loop−connection and the HART® connection to the field device 308. Resistors 480 and 482, and capacitors 484 and 486 are connected in series with the HART® connection to the field device 308. In one embodiment, resistor 480 has a value of 49.9 ohms, resistance 482 has a value of 248 ohms, capacitor 484 has a value of 2.2 μF and capacitor 486 has a value of 2.2 μF.

In order to ensure that the wireless adapter meets intrinsic safety requirements, the intrinsic safety circuitry 460 is configured to limit the voltage and current that the circuitry within the adapter 300 is capable of applying to the two wire process control loop 302. This limiting must occur both under normal operating conditions as well as during a fault. Further, the circuitry should be redundant and continue to operate as desired even if some of the circuitry components should fail. In one specific configuration, it is preferable to limit the voltage to less than 1.5 volts and the current to less than 100 mA.

Zener diodes can be used as voltage limiters for the intrinsic safety circuitry 460 and can be configured to conduct current only during a fault condition. In other words, the Zener voltage is selected to be slightly higher than the operating voltage of the circuitry. In this way, the Zener diodes do not waste power during normal circuitry operation. Thus, in order to limit the voltage into or out of the wireless adapter 300 to be less than 1.5 volts, the operating voltage of the wireless adapter electronics must be less than 1.5 volts.

In operation Zener diodes 462 and 464 operate to limit the voltage which can applied between the loop + and loop − terminals. Similarly, diodes 470 and 472 operate to limit the voltage which can be introduced into the circuitry by the loop + and HART® terminals. Diodes 474 and 476 limit the voltage which can be introduced through the loop − in HART® terminals. If the voltage applied across these terminals exceeds the thresholds of the diodes, the diodes will conduct and thereby limit the voltage value. However, during normal operating conditions, the diodes are not conducting and therefore will not have any affect on operation of the circuitry. The resistance which is added in series with the capacitance acts to reduce the amount of charge which can be instantaneously removed from the capacitance, and therefore reduces the chance that a capacitance may cause a spark. For a particular voltage level, additional capacitance may be used in circuitry if there is additional resistance in series with the capacitance. The larger the resistance, the larger that the capacitance may be. The resistance that is connected to the HART® terminal also limits the amount of current which can be provided from that terminal.

Figure 13:
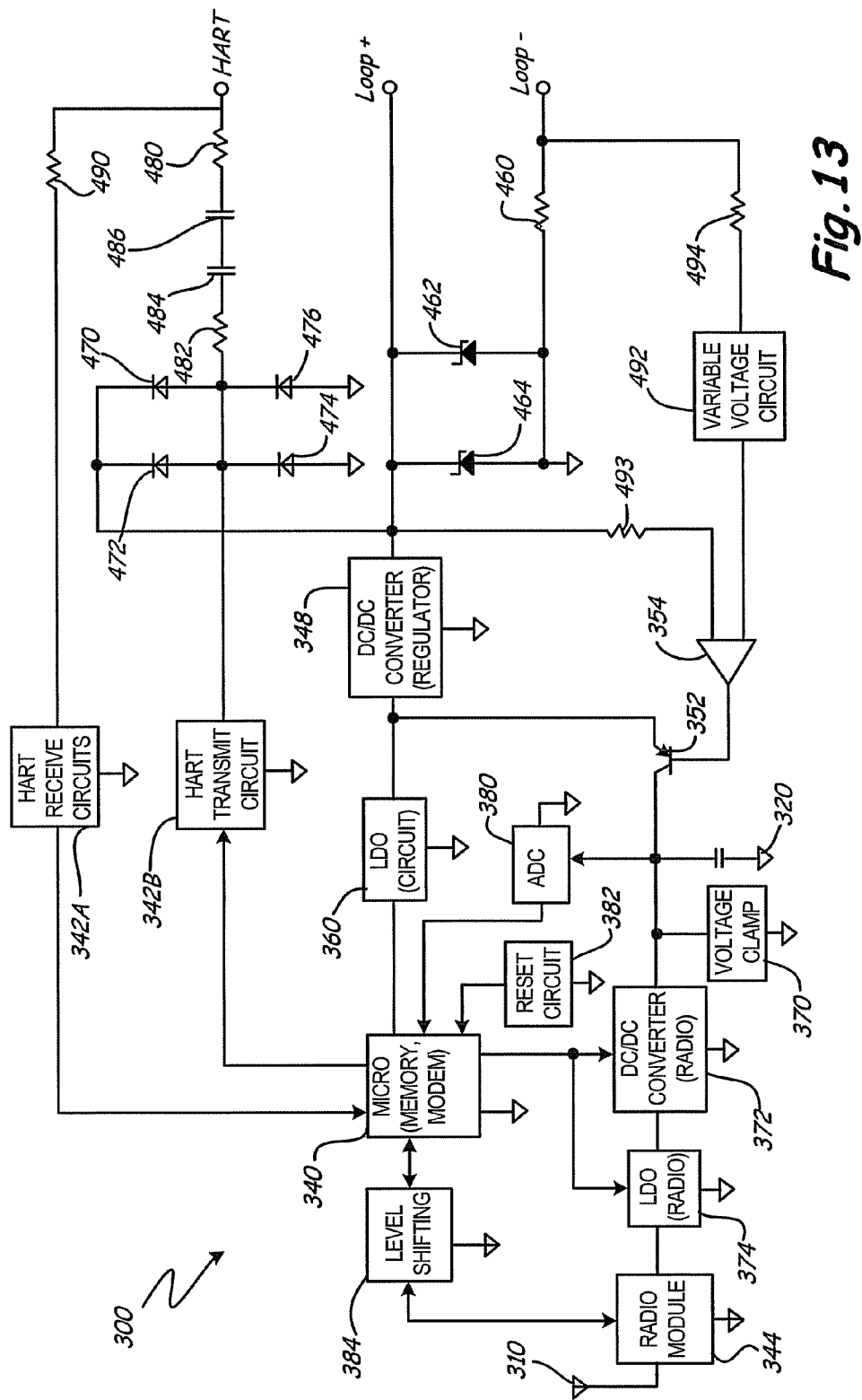
FIG. 13 is a more detailed schematic diagram of the wireless adapter of FIG. 12.

FIG. 13 is a more detailed block diagram similar to FIG. 9. Some of the elements have retained their numbering. In FIG. 13, the HART® analog circuit 342 is illustrated as two separate components, receive circuit 342A and transmit circuit 342B. The HART® receive circuit 342A couples to the HART® connection through resistor 490 which can comprise, for example, a 10K ohm resistance. Further, the input to the differential amplifier 354 is provided by variable voltage circuitry 492 and also couples to the Loop + terminal through resistor 493. The variable voltage circuit 492 couples to the Loop − connection through resister 494 which can comprise, for example, 12.1K ohms.

In the circuitry discussed above, diodes, such as Zener diodes are used to provide intrinsically safe circuitry. However, the Zener diodes are generally rated at 3.3 volts or higher, which exceeds the desired limits for intrinsic safety. One such technique which can be used to limit the voltages to less than 3.3 volts is to use active shunt regulators instead of Zener diodes. These regulators can be set to limit the voltage to 1.24 volts without requiring any external resisters, or to higher voltages through the use of resisters in the circuitry. However, one drawback to using active shunt regulators is that they are typically only rated to handle relatively small power levels, for example 0.20 to 0.25 watts. Therefore, the power that they dissipate must be limited through the use of a fuse or the like.

Figure 14:
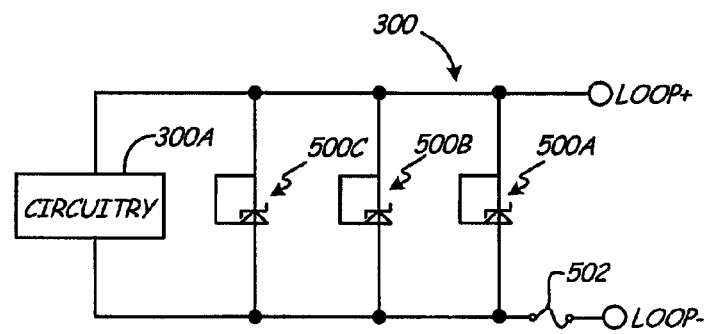
FIG. 14 is a simplified schematic diagram showing intrinsic safety circuitry showing active circuitry.

FIG. 14 is a simplified schematic diagram showing wireless adapter 300, and wireless adapter circuitry shown generally at 300A, which includes three active shunt regulators 500A, 500B and 500C connected across the loop + and loop − terminals. A fuse 502 is connected in series with the loop connection. The shunt regulators may comprise, for example, TLVH431 regulators available from Texas Instruments. In accordance with intrinsic safety principles, as the shunt regulators are active circuits, three shunt regulators must be provided for redundancy. The regulators are arranged so that they limit both the voltage that can be applied to the two wire process control loop 302 as well as the voltage which is applied to circuitry 300A.

Figure 15:
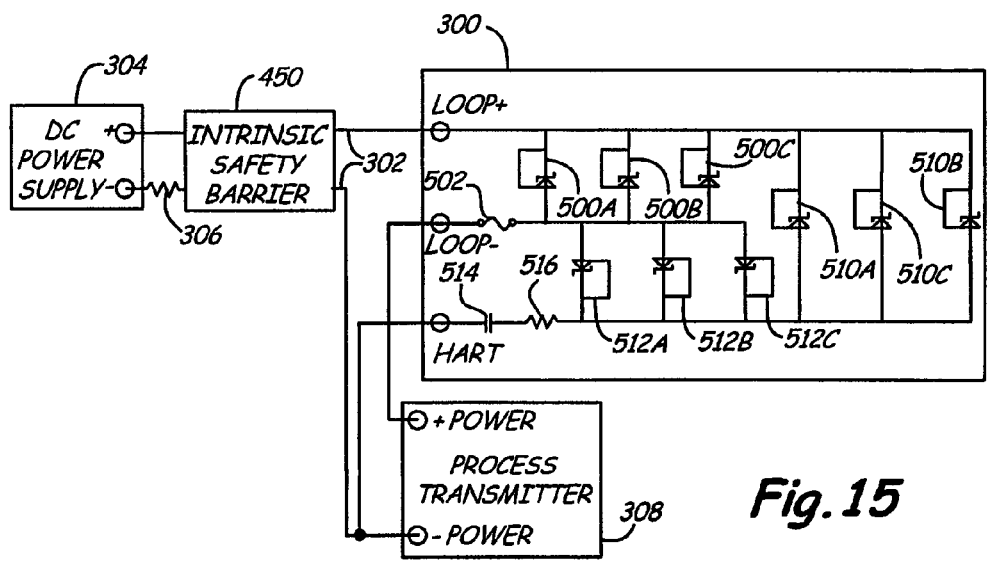
FIG. 15 is a simplified schematic diagram showing the wireless adapter using active intrinsic safety circuitry.

However, one additional complicating factor in providing intrinsic safety by limiting both voltage and current that the wireless adapter 300 can place on the control loop is that the adapter 300 circuitry includes a third connection. This is the communication connection identified as the HART® connection in the description set forth herein. Intrinsic safety requirements require that the voltage and current which the adapter 300 is capable of outputting at any time be limited for any combination of its three terminals. Therefore, active shunt regulators can also be used with the HART® connection as illustrated in FIG. 15. As illustrated in FIG. 15, two additional sets of active shunt regulators are required. Shunt regulators 510A, 5101B and 510C are connected between the loop + terminal and the HART® terminal. Similarly, active shunt regulators 512A, 512B and 512C are connected between the loop− terminal and the HART® terminal. A capacitor 514 and resistance 516 are provided as discussed above.

Figure 16:
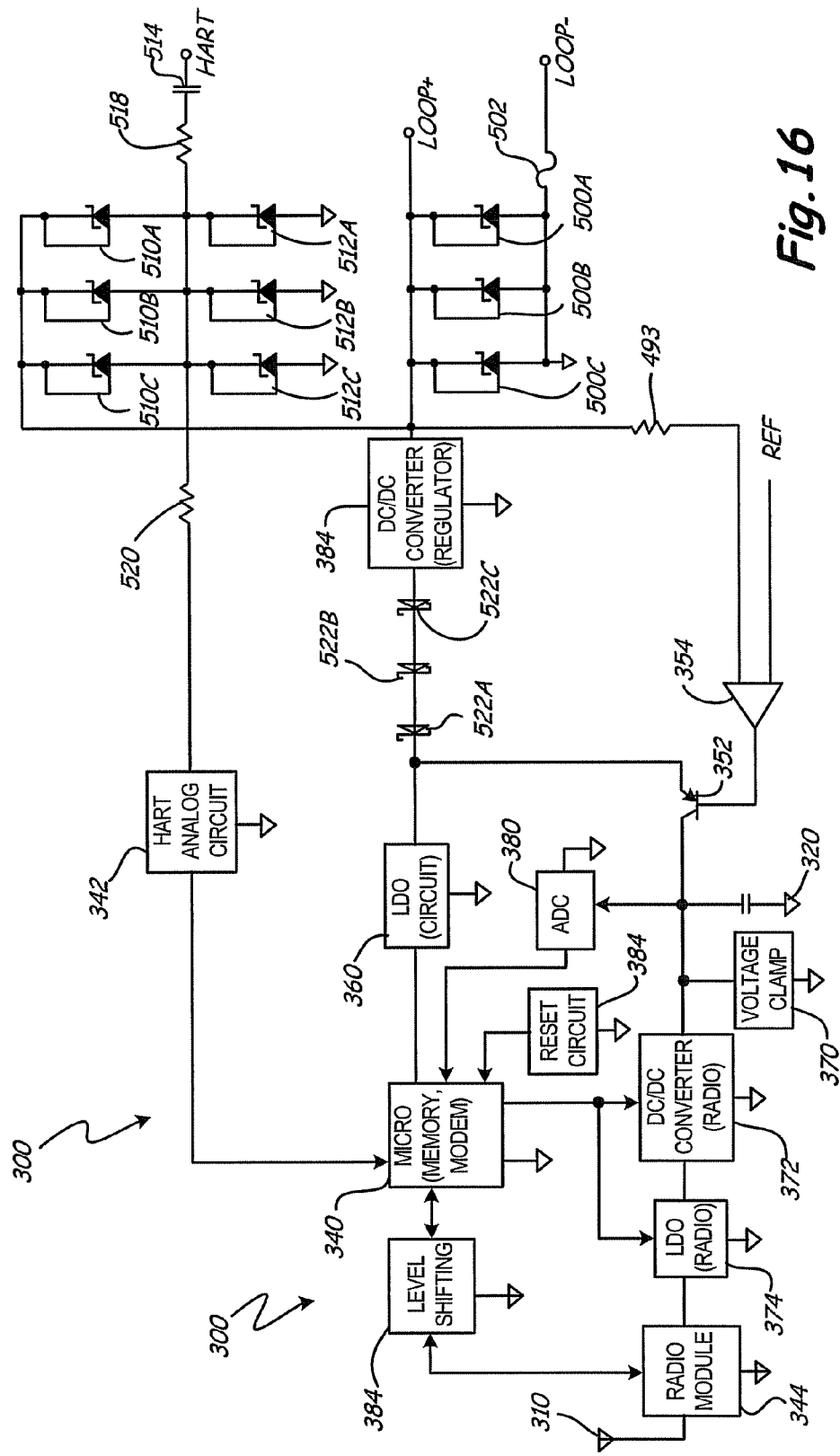
FIG. 16 is a more detailed schematic diagram of the wireless adapter of FIG. 15.

Another method that may be used to limit the current that a capacitor can place on to the process control loop is to insert an electrical resistance at any path from the capacitor to the loop terminals. However, this requires a resistance between the step up DC to DC converter 384 and the capacitor to limit the current to 100 mA which will result in a very large power loss. Less power is lost if three voltage drop Schottky diodes are placed in series between the DC to DC converter in the capacitor. An example of such circuitry is illustrated at FIG. 16. In this configuration, the connection to the HART® terminal can be limited by using a sufficiently large resistance 518 and 520. Three Schottky diodes 522A, 522B and 522C are used to couple the DC to DC converter 384 to the circuitry of the wireless adapter 300. An example Schottky diode is an RV161M available from Rohm of Plano, Tex. Other potential paths from the capacitor 320 to the terminals include high resistive elements such as the connection through amplifier 354.

In the above discussion, capacitor 320 comprises a "regular" capacitor having a capacitance of, for example, 10,000 µF. However, in some configurations, it may be desirable to store additional energy. In such a configuration, a "super capacitor" can be used which may have a capacitance of 0.1 Farads or more. If a super capacitor is used for capacitance 320, alternative configurations must be used to provide intrinsic safety. This is because the maximum discharge from the circuitry must be limited. In general, the lower value to which the voltage and current are limited, the less energy the circuitry will be capable of providing back into the process control loop. For example, it is desirable to limit the voltage to 1.5 volts or less and the current to 100 MA or less.

The above configuration provides an adapter which enables wireless communication with a process variable transmitter. The circuitry can be configured to operate from power which is already available to the process variable transmitter. Increased efficiency can be obtained by placing the energy storage element as a shunt element in a loop shunt regulator. A "step up" regulator can be provided which is part of the feedback circuit for the shunt regulator control. This configuration increases efficiency while reducing the number of components required.

The term "field device" as used herein can be any device which is used in a process controller monitoring system and does not necessarily require placement in the "field." The device can be located anywhere in the process control system including in a control room or control circuitry. The terminals used to connect to the process control loop refer to any electrical connection and may not comprise physical or discrete terminals. Any appropriate radio frequency communication circuitry can be used as desired as can any appropriate communication protocol, frequency or communication technique. The power supply circuitry is configured as desired and is not limited to the configurations set forth herein. In some embodiments, the field device includes an address which can be included in any RF transmissions such that the device can be identified. Similarly, such an address can be used to determine if a received signal is intended for that particular device. However, in other embodiments, no address is utilized and data is simply transmitted from the wireless communication circuitry without any addressing information. In such a configuration, if receipt of data is desired, any received data may not include addressing information. In some embodiments, this may be acceptable. In others, other addressing techniques or identification techniques can be used such as assigning a particular frequency or communication protocol to a particular device, assigning a particular time slot or period to a particular device or other techniques. Any appropriate communication protocol and/or networking technique can be employed including token-based techniques in which a token is handed off between devices to thereby allow transmission or reception for the particular device.

Although the present invention has been described with reference to preferred embodiments, workers skilled in the art will recognize that changes may be made in form and detail without departing from the spirit and scope of the invention. As used herein, Radio Frequency (RF) can comprise electromagnetic transmissions of any frequency and is not limited to a particular group of frequencies, range of frequencies or any other limitation. Any communication protocol can be used, as desired, including IEEE 802.11b, 802.15.4, or other protocols, including proprietary protocols as well as standardized protocols such as the wireless HART® communication protocol. In the discussion above, the wireless adapter provides a digital signal communication connection for coupling to the two wire process control loop and, in some embodiments, communicating in accordance with the HART® communication protocol. This connection is illustrated in FIGS. 8A and 8B as being a parallel connection with the process variable transmitter and which does not carry substantial loop current. The power connection is illustrated as being in series with the process control loop. As used herein, bypass circuitry includes the bypass configurations shown in FIGS. 4 and 5, the shunt configurations shown in FIGS. 7 and 9, or other circuitry. The adapter can be configured to mount externally to a process control transmitter, for example, through a threaded coupling to NPT fittings in the transmitter housing. In the above discussion, when a capacitor which is not a super capacitor is employed, for example on the order of 10,000 µF is used to store energy, the intrinsic safety circuitry of the present invention operates to limit the maximum available energy which is entering the circuitry of the adapter. This is because in accordance with intrinsic safety standard, the voltage across a given capacitance must be kept below a level that could result in the capacitance creating a spark if an instantaneous short circuit occurred. Thus, in the above discussion, by limiting the maximum circuit voltage which can be received by circuitry in the adapter, the size of the capacitance can be increased. However, for extremely large capacitance values, i.e. "super capacitors", the capacitor must be treated as an energy storage device. In such configurations, the intrinsic safety circuitry of the present invention operates to limit the maximum amount of energy which can come out of the adapter circuitry. In the above discussion, the maximum current and voltage which can be produced by the adapter is limited to 1.24 volts and 100 mA. Thus, the intrinsic safety circuitry of the present invention operates in two different manners depending upon the size of the capacitance employed.

What is claimed is:

1. An adapter for coupling to a process control transmitter of the type used to monitor a process variable in an industrial process, the adapter comprising:
a first adapter connection configured to couple to a first wire of a two wire process control loop;
a second adapter connection configured to couple to a first transmitter connection of a process control transmitter;
a third adapter connection configured to couple to a second transmitter connection of the process control transmitter and to a second wire of the process control loop, wherein the third adapter connection is used to communicate information on the two wire process control loop;
wireless communication circuitry configured to provide wireless communication for the process control transmitter, wherein the first and second adapter connections are used to power the wireless communication circuitry; and
intrinsic safety circuitry coupled to at least one of the first, second and third adapter connections configured to limit energy transfer to a value which is less than an intrinsic safety value, wherein the two wire loop is used for powering the process control transmitter and powering the wireless communication circuitry, and the two wire process control loop is further configured to ca information communicated from the third adapter connection.

2. The apparatus of claim 1 wherein the intrinsic safety circuitry comprises a diode.

3. The apparatus of claim 2 wherein the diode comprises a zener diode.

4. The apparatus of claim 2 wherein the diode is connected between the first and second adapter connections.

5. The apparatus of claim 2 wherein the diode is connected between the second and third adapter connections.

6. The apparatus of claim 2 wherein the diode is connected between the first and third adapter connections.

7. The apparatus of claim 1 wherein the intrinsic safety circuitry is coupled between the first, second and third adapter connections.

8. The apparatus of claim 1 including a capacitor configured to store energy for use in operating the wireless communication circuitry.

9. The apparatus of claim 8 wherein the capacitor comprises a super capacitor.

10. The apparatus of claim 1 wherein the intrinsic safety circuitry comprises active circuitry.

11. The apparatus of claim 10 wherein the active circuitry is configured to provide triple redundancy of components.

12. The apparatus of claim 10 wherein the active circuitry comprises an active shunt.

13. The apparatus of claim 1 including a fuse coupled in series with at least one of the first, second and third adapter connections.

14. The apparatus of claim 8 wherein the intrinsic safety circuitry is coupled in series between the capacitor and the at least one of the first, second and third adapter connections.

15. The apparatus of claim 14 wherein the intrinsic safety circuitry comprises a diode.

16. The apparatus of claim 14 wherein the intrinsic safety circuitry comprises a resistance.

17. The apparatus of claim 1 wherein the intrinsic circuitry is configured to limit storage of electrical energy stored in the adapter to a value which is less than the intrinsic safety value.

18. The apparatus of claim 1 including communication circuitry configured to communicate with the process control transmitter.

19. A method of coupling a wireless adapter to a process control transmitter of the type used to monitor a process variable in an industrial process, the method comprising:
   coupling a first adapter connection to a first wire of a two wire process control loop;
   coupling a second adapter connection to a first transmitter connection of a process control transmitter;
   coupling a third adapter connection to a second transmitter connection of the process control transmitter;
   powering wireless communication circuitry with power received from the two wire process control loop through the first and second adapter connections;
   communicating information on the two wire process control loop using the third adapter connection; and
   limiting energy transfer through at least one of the first, second and third adaptive connections to a value which is less than an intrinsic safety value, wherein the two wire loop is used for powering the process control transmitter and powering the wireless communication circuitry, and the two wire process control loop is further configured to carry information communicated from the third adapter connection.

20. The method of claim 19 wherein limiting energy transfer comprising limiting energy going into circuitry of the adapter.

21. The method of claim 19 wherein limiting energy transfer comprising limiting energy coming out of circuitry in the adapter.

22. The method of claim 19 including storing energy in a capacitor.

23. The method of claim 22 wherein the capacitor comprises a super capacitor.

24. The method of claim 19 wherein the step of limiting uses active circuitry.

25. The method of claim 20 including limiting storage of electrical energy in the adapter to a value which is less than the value of the intrinsic safety value.

* * * * *